(12) United States Patent
Leitner et al.

(10) Patent No.: US 8,844,957 B2
(45) Date of Patent: Sep. 30, 2014

(54) RETRACTABLE VEHICLE STEP

(71) Applicant: 88908, Inc., Tustin, CA (US)

(72) Inventors: Horst Leitner, Laguna Beach, CA (US); Anthony Smith, Costa Mesa, CA (US)

(73) Assignee: Lund Motion Products, Inc., Tustin, CA (US)

( * ) Notice: Subject to any disclaimer, the term of this patent is extended or adjusted under 35 U.S.C. 154(b) by 0 days.

(21) Appl. No.: 13/853,904

(22) Filed: Mar. 29, 2013

(65) Prior Publication Data

US 2014/0008890 A1    Jan. 9, 2014

Related U.S. Application Data

(63) Continuation of application No. 13/445,663, filed on Apr. 12, 2012, now Pat. No. 8,408,571, which is a continuation of application No. 12/511,027, filed on Jul. 28, 2009, now Pat. No. 8,157,277, which is a continuation of application No. 12/143,559, filed on Jun. 20, 2008, now Pat. No. 7,566,064, which is a continuation of application No. 11/182,267, filed on Jul. 15, 2005, now Pat. No. 7,398,985, which is a continuation of application No. 10/993,047, filed on Nov. 19, 2004, now Pat. No. 7,007,961, which is a continuation of application No. 10/274,418, filed on Oct. 16, 2002, now Pat. No. 6,834,875, said application No. 12/511,027 is a continuation-in-part of application No. 12/143,619, filed on Jun. 20, 2008, now Pat. No. 7,584,975, which is a continuation of application No. 11/417,395, filed on May 3, 2006, now Pat. No. 7,413,204, which is a continuation of application No. 10/996,125, filed on Nov. 23, 2004, now Pat. No. 7,055,839, which is a continuation of application No. 10/689,254, filed on Oct. 20, 2003, now Pat. No. 6,830,257, which is a continuation of application No. 09/817,897, filed on Mar. 26, 2001, now Pat. No. 6,641,158.

(60) Provisional application No. 60/404,353, filed on Aug. 15, 2002, provisional application No. 60/350,129, filed on Oct. 16, 2001, provisional application No. 60/269,286, filed on Feb. 15, 2001, provisional application No. 60/274,417, filed on Mar. 8, 2001.

(51) Int. Cl.
*B60R 3/02* (2006.01)
*B60R 3/00* (2006.01)

(52) U.S. Cl.
CPC .. *B60R 3/02* (2013.01); *B60R 3/002* (2013.01)
USPC ....................................................... 280/166

(58) Field of Classification Search
USPC .................. 280/163, 164.1, 164.2, 166, 169
See application file for complete search history.

(56) References Cited

U.S. PATENT DOCUMENTS

| 7,591 A | 8/1850 | Burdett |
| 752,031 A | 2/1904 | Chadwick |

(Continued)

FOREIGN PATENT DOCUMENTS

| CA | 2082177 | 5/1994 |
| CA | 2370618 | 11/2000 |

(Continued)

OTHER PUBLICATIONS

U.S. Appl. No. 09/817,897, filed Mar. 26, 2001, now U. S. Patent No. 6,641,158, issued Nov. 4, 2003.

(Continued)

*Primary Examiner* — John Walters
(74) *Attorney, Agent, or Firm* — Knobbe, Martens, Olson & Bear, LLP

(57) ABSTRACT

A retractable step for use with a vehicle comprises a stepping member having an upper stepping surface, a first arm, and a second arm. The first arm has a first end pivotally attached to the vehicle, and a second end pivotally attached to the stepping member. The second arm also has a first end pivotally attached to the vehicle, and a second end pivotally attached to the stepping member. The first and second arms can be generally planar linkages.

19 Claims, 25 Drawing Sheets

(56) References Cited

U.S. PATENT DOCUMENTS

| | | | |
|---|---|---|---|
| 955,658 A | 4/1910 | Mitchell et al. | |
| 1,250,604 A | 12/1917 | Lorenc | |
| 1,471,972 A | 10/1923 | Miller | |
| 2,122,040 A | 6/1938 | Machovec | |
| 2,125,085 A | 7/1938 | Pool | |
| 2,436,961 A | 3/1948 | Gabriel | |
| 2,487,921 A | 11/1949 | Culver | |
| 2,492,068 A | 12/1949 | Schofield et al. | |
| 2,566,401 A | 9/1951 | Leopold | |
| 2,575,615 A | 11/1951 | Crump | |
| 2,669,613 A | 2/1954 | Despard | |
| 2,678,832 A | 5/1954 | Wright | |
| 2,764,422 A | 9/1956 | McDonald | |
| 2,925,876 A | 2/1960 | Wagner | |
| 3,039,562 A | 6/1962 | Wagner | |
| 3,095,216 A | 6/1963 | Browne et al. | |
| 3,172,499 A | 3/1965 | Stairs | |
| 3,329,443 A | 7/1967 | Lowder et al. | |
| 3,392,990 A * | 7/1968 | Wolf | 280/163 |
| 3,488,066 A | 1/1970 | Hansen | |
| 3,494,634 A | 2/1970 | De Paula | |
| 3,522,396 A | 7/1970 | Norden | |
| 3,528,574 A | 9/1970 | Denner et al. | |
| 3,572,754 A | 3/1971 | Fowler | |
| 3,762,742 A | 10/1973 | Bucklen | |
| 3,807,757 A | 4/1974 | Carpenter et al. | |
| 3,833,240 A * | 9/1974 | Weiler | 280/166 |
| 3,865,399 A | 2/1975 | Way | |
| 3,887,217 A | 6/1975 | Thomas | |
| 3,889,997 A | 6/1975 | Schoneck | |
| 3,891,261 A | 6/1975 | Finneman | |
| 3,957,284 A | 5/1976 | Wright | |
| 3,961,809 A | 6/1976 | Clugston | |
| 3,980,319 A | 9/1976 | Kirkpatrick | |
| 3,981,515 A | 9/1976 | Rosborough | |
| 4,020,920 A | 5/1977 | Abbott | |
| 4,068,542 A | 1/1978 | Brand et al. | |
| 4,073,502 A | 2/1978 | Frank et al. | |
| 4,106,790 A | 8/1978 | Weiler | |
| 4,110,673 A | 8/1978 | Nagy et al. | |
| 4,116,457 A | 9/1978 | Nerem et al. | |
| 4,164,292 A | 8/1979 | Karkau | |
| 4,174,021 A | 11/1979 | Barlock | |
| 4,180,143 A | 12/1979 | Clugston | |
| 4,185,849 A | 1/1980 | Jaeger | |
| 4,188,889 A | 2/1980 | Favrel | |
| 4,231,583 A | 11/1980 | Learn | |
| 4,424,751 A | 1/1984 | Blochlinger | |
| 4,440,364 A | 4/1984 | Cone et al. | |
| 4,462,486 A | 7/1984 | Dignan | |
| 4,536,004 A | 8/1985 | Brynielsson et al. | |
| 4,542,805 A | 9/1985 | Hamlin et al. | |
| 4,570,962 A | 2/1986 | Chavira | |
| 4,623,160 A | 11/1986 | Trudell | |
| D287,001 S | 12/1986 | Jarvie et al. | |
| 4,679,810 A | 7/1987 | Kimball | |
| 4,720,116 A | 1/1988 | Williams et al. | |
| 4,733,752 A | 3/1988 | Sklar | |
| 4,909,700 A | 3/1990 | Fontecchio et al. | |
| 4,982,974 A * | 1/1991 | Guidry | 280/164.2 |
| 5,005,667 A | 4/1991 | Anderson | |
| 5,005,850 A | 4/1991 | Baughman | |
| 5,039,119 A | 8/1991 | Baughman | |
| 5,085,450 A | 2/1992 | DeHart, Sr. | |
| 5,137,294 A | 8/1992 | Martin | |
| 5,154,125 A | 10/1992 | Renner et al. | |
| 5,195,609 A | 3/1993 | Ham et al. | |
| 5,199,731 A | 4/1993 | Martin | |
| 5,228,707 A | 7/1993 | Yoder | |
| 5,228,761 A | 7/1993 | Huebschen et al. | |
| 5,238,300 A | 8/1993 | Slivon et al. | |
| 5,257,847 A | 11/1993 | Yonehara | |
| 5,284,349 A | 2/1994 | Bruns et al. | |
| 5,286,049 A | 2/1994 | Khan | |
| 5,342,073 A | 8/1994 | Poole | |
| 5,358,268 A | 10/1994 | Hawkins | |
| 5,375,864 A | 12/1994 | McDaniel | |
| 5,423,463 A | 6/1995 | Weeks | |
| 5,439,342 A | 8/1995 | Hall et al. | |
| 5,462,302 A | 10/1995 | Leitner | |
| 5,498,012 A | 3/1996 | McDaniel et al. | |
| 5,501,475 A | 3/1996 | Bundy | |
| 5,505,476 A | 4/1996 | Maccabee | |
| 5,513,866 A | 5/1996 | Sisson | |
| 5,538,100 A * | 7/1996 | Hedley | 182/97 |
| 5,538,265 A | 7/1996 | Chen et al. | |
| 5,538,269 A | 7/1996 | McDaniel et al. | |
| 5,547,040 A | 8/1996 | Hanser et al. | |
| 5,584,493 A | 12/1996 | Demski et al. | |
| 5,601,300 A | 2/1997 | Fink et al. | |
| 5,727,840 A | 3/1998 | Ochiai et al. | |
| 5,779,208 A | 7/1998 | McGraw | |
| 5,842,709 A * | 12/1998 | Maccabee | 280/166 |
| 5,897,125 A | 4/1999 | Bundy | |
| 5,941,342 A | 8/1999 | Lee | |
| 5,957,237 A * | 9/1999 | Tigner | 182/127 |
| 6,042,052 A | 3/2000 | Smith | |
| 6,055,780 A | 5/2000 | Yamazaki | |
| 6,082,751 A | 7/2000 | Hanes et al. | |
| 6,149,172 A * | 11/2000 | Pascoe et al. | 280/166 |
| 6,168,176 B1 | 1/2001 | Mueller | |
| 6,179,312 B1 | 1/2001 | Paschke et al. | |
| 6,203,040 B1 | 3/2001 | Hutchins | |
| 6,213,486 B1 | 4/2001 | Kunz et al. | |
| 6,264,222 B1 | 7/2001 | Johnston et al. | |
| 6,270,099 B1 | 8/2001 | Farkash | |
| 6,325,397 B1 | 12/2001 | Pascoe et al. | |
| 6,375,207 B1 * | 4/2002 | Dean et al. | 280/166 |
| 6,412,799 B1 | 7/2002 | Schrempf | |
| 6,422,342 B1 | 7/2002 | Armstrong et al. | |
| 6,425,572 B1 | 7/2002 | Lehr | |
| 6,435,534 B1 | 8/2002 | Stone | |
| 6,439,342 B1 | 8/2002 | Boykin | |
| 6,460,915 B1 | 10/2002 | Bedi et al. | |
| 6,513,821 B1 | 2/2003 | Heil | |
| 6,533,303 B1 | 3/2003 | Watson | |
| 6,641,158 B2 | 11/2003 | Leitner | |
| 6,659,484 B2 | 12/2003 | Knodle et al. | |
| 6,663,125 B1 | 12/2003 | Cheng | |
| 6,746,033 B1 | 6/2004 | McDaniel | |
| 6,810,995 B2 | 11/2004 | Warford | |
| 6,830,257 B2 | 12/2004 | Leitner | |
| 6,834,875 B2 | 12/2004 | Leitner et al. | |
| 6,840,526 B2 | 1/2005 | Anderson et al. | |
| 6,918,624 B2 | 7/2005 | Miller et al. | |
| 6,926,295 B2 | 8/2005 | Berkebile et al. | |
| 6,938,909 B2 | 9/2005 | Leitner | |
| 6,942,233 B2 | 9/2005 | Leitner et al. | |
| 6,942,272 B2 | 9/2005 | Livingston | |
| 6,948,903 B2 | 9/2005 | Ablabutyan et al. | |
| 6,951,357 B2 | 10/2005 | Armstrong et al. | |
| 6,955,370 B2 | 10/2005 | Fabiano et al. | |
| 6,959,937 B2 | 11/2005 | Schneider et al. | |
| 6,966,597 B2 | 11/2005 | Tegtmeier | |
| 6,971,652 B2 | 12/2005 | Bobbert et al. | |
| 6,997,469 B2 | 2/2006 | Lanoue et al. | |
| 7,000,932 B2 | 2/2006 | Heil et al. | |
| 7,007,961 B2 | 3/2006 | Leitner et al. | |
| 7,017,927 B2 | 3/2006 | Henderson et al. | |
| 7,055,839 B2 | 6/2006 | Leitner | |
| 7,070,194 B2 | 7/2006 | Garland et al. | |
| 7,090,276 B1 | 8/2006 | Bruford et al. | |
| 7,111,858 B2 | 9/2006 | Manser et al. | |
| 7,111,859 B2 | 9/2006 | Kim | |
| 7,118,120 B2 | 10/2006 | Lee et al. | |
| 7,118,150 B2 | 10/2006 | Bruford et al. | |
| 7,163,221 B2 | 1/2007 | Leitner | |
| 7,219,911 B2 | 5/2007 | Sukonthapanich et al. | |
| 7,287,771 B2 | 10/2007 | Lee et al. | |
| 7,311,320 B2 | 12/2007 | Kuntze et al. | |
| 7,318,596 B2 | 1/2008 | Scheuring, III et al. | |
| 7,367,574 B2 | 5/2008 | Leitner | |
| 7,377,531 B2 | 5/2008 | Fabiano et al. | |
| 7,380,807 B2 | 6/2008 | Leitner | |

(56) References Cited

U.S. PATENT DOCUMENTS

| | | |
|---|---|---|
| 7,398,985 B2 | 7/2008 | Leitner |
| 7,413,204 B2 | 8/2008 | Leitner |
| 7,413,205 B2 | 8/2008 | Watson |
| 7,434,825 B2 | 10/2008 | Williams |
| 7,438,305 B2 | 10/2008 | Schulz |
| 7,441,790 B2 | 10/2008 | Lechkun |
| 7,445,221 B2 | 11/2008 | Kobayashi |
| 7,469,916 B2 | 12/2008 | Watson |
| 7,487,986 B2 | 2/2009 | Leitner et al. |
| 7,513,520 B2 | 4/2009 | Okuyama |
| 7,530,619 B1 | 5/2009 | Bruford et al. |
| 7,566,064 B2 | 7/2009 | Leitner et al. |
| 7,584,975 B2 | 9/2009 | Leitner |
| 7,594,672 B2 | 9/2009 | Piotrowski |
| 7,621,546 B2 | 11/2009 | Ross et al. |
| 7,637,519 B2 | 12/2009 | Leitner et al. |
| 7,673,892 B2 | 3/2010 | Kuntze et al. |
| 7,703,784 B2 | 4/2010 | Plavetich |
| 7,712,755 B2 | 5/2010 | Yang et al. |
| 7,740,260 B2 | 6/2010 | VanBelle et al. |
| 7,740,261 B2 | 6/2010 | Leitner et al. |
| 7,775,536 B2 | 8/2010 | Shumway |
| 7,793,596 B2 | 9/2010 | Hirtenlehner |
| 7,900,944 B2 | 3/2011 | Watson |
| 7,976,042 B2 | 7/2011 | Watson et al. |
| 8,038,164 B2 | 10/2011 | Stahl et al. |
| 8,042,821 B2 | 10/2011 | Yang et al. |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,157,277 B2 | 4/2012 | Leitner et al. |
| 8,262,113 B1 | 9/2012 | Chafey et al. |
| 8,297,635 B2 | 10/2012 | Agoncillo et al. |
| 8,342,550 B2 | 1/2013 | Stickles et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 2002/0109446 A1 | 8/2002 | Arnold |
| 2003/0090081 A1 | 5/2003 | Oakley |
| 2003/0094781 A1 | 5/2003 | Jaramillo et al. |
| 2004/0207224 A1 | 10/2004 | Miller et al. |
| 2006/0208449 A1 | 9/2006 | Kuo et al. |
| 2008/0034552 A1 | 2/2008 | Nguyen |
| 2008/0084045 A1 | 4/2008 | Filias et al. |
| 2012/0228848 A1 | 9/2012 | Fichter |

FOREIGN PATENT DOCUMENTS

| | | |
|---|---|---|
| CA | 2332193 | 9/2001 |
| DE | 31 51 621 A1 | 7/1983 |
| DE | 39 32 142 A1 | 4/1990 |
| DE | 89 10 933 | 11/1990 |
| GB | 934387 | 8/1963 |
| GB | 2045699 | 11/1980 |
| GB | 212 9378 | 5/1984 |
| JP | 63255144 | 10/1988 |
| JP | 4339040 | 11/1992 |
| JP | 4339041 | 11/1992 |
| JP | 04342629 A | 11/1992 |
| JP | 05310081 A | 11/1993 |
| SU | 403594 | 10/1973 |
| WO | WO 2006/050297 A2 | 5/2006 |

OTHER PUBLICATIONS

U.S. Appl. No. 10/689,254, filed Oct. 20, 2003, now U. S. Patent No. 6,830,257, issued Dec. 14, 2004.
U.S. Appl. No. 10/996,125, filed Nov. 23, 2004.
U.S. Appl. No. 10/274,418, filed Oct. 16, 2002.
U.S. Appl. No. 10/993,047, filed Nov. 19, 2004.
U.S. Appl. No. 10/643,708, filed Aug. 19, 2003.
U.S. Appl. No. 10/641,358, filed Aug. 14, 2003.
U.S. Appl. No. 10/977,321, filed Oct. 29, 2004.
U.S. Appl. No. 10/961,835, filed Oct. 8, 2004.
U.S. Appl. No. 12/143,619, filed Jun. 20, 2008.
U.S. Appl. No. 11/417,506, filed May 3, 2006.
U.S. Appl. No. 11/417,395, filed May 3, 2006.
U.S. Appl. No. 11/182,267, filed Jul. 15, 2005.
U.S. Appl. No. 11/191,615, filed Jul. 28, 2005.
U.S. Appl. No. 11/924,549, filed Oct. 25, 2007.
U.S. Appl. No. 11/924,956, filed Oct. 26, 2007.
U.S. Appl. No. 12/143,559, filed Jun. 20, 2008.
U.S. Appl. No. 12/511,027, filed Jul. 28, 2009.
U.S. Appl. No. 12/638,890, filed Dec. 15, 2009.
U.S. Appl. No. 13/445,663, filed Apr. 12, 2012.
U.S. Appl. No. 13/286,133, filed Oct. 31, 2011, pending.
U.S. Appl. No. 13/750,755, filed Jan. 25, 2013, pending.
U.S. Appl. No. 13/857,956, filed Apr. 5, 2013, pending.
U.S. Appl. No. 12/819,078, filed Jun. 18, 2010.

* cited by examiner

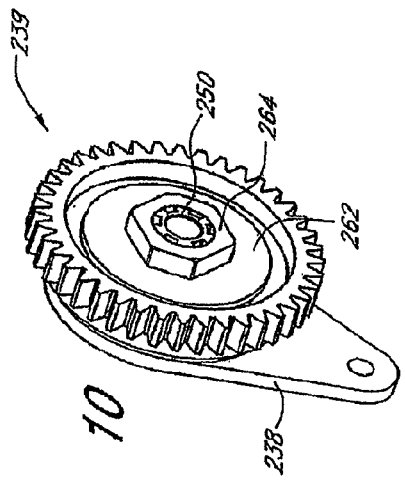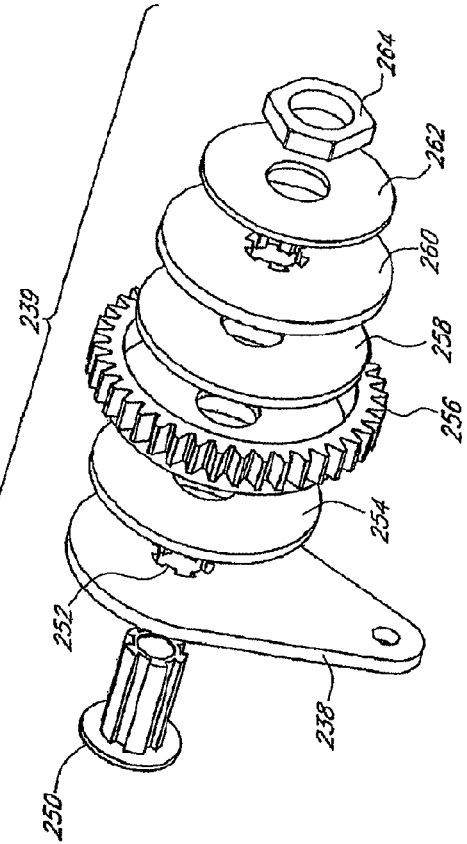

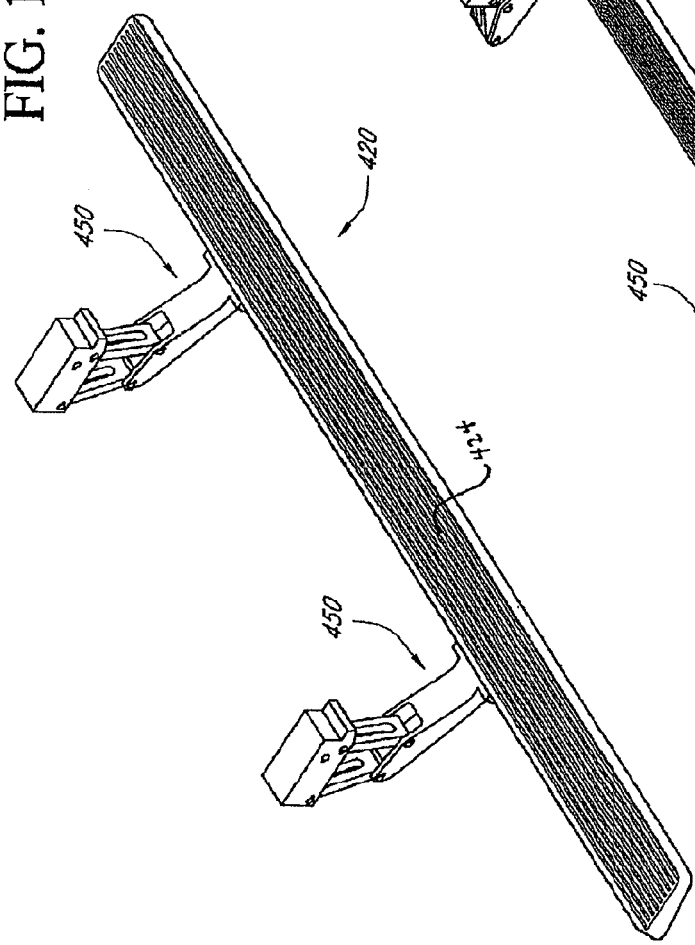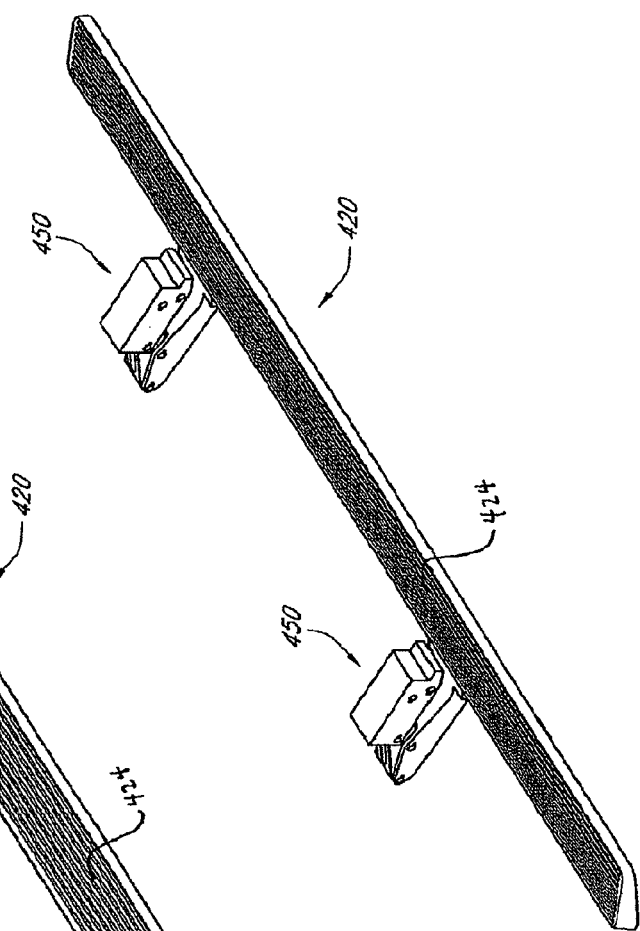

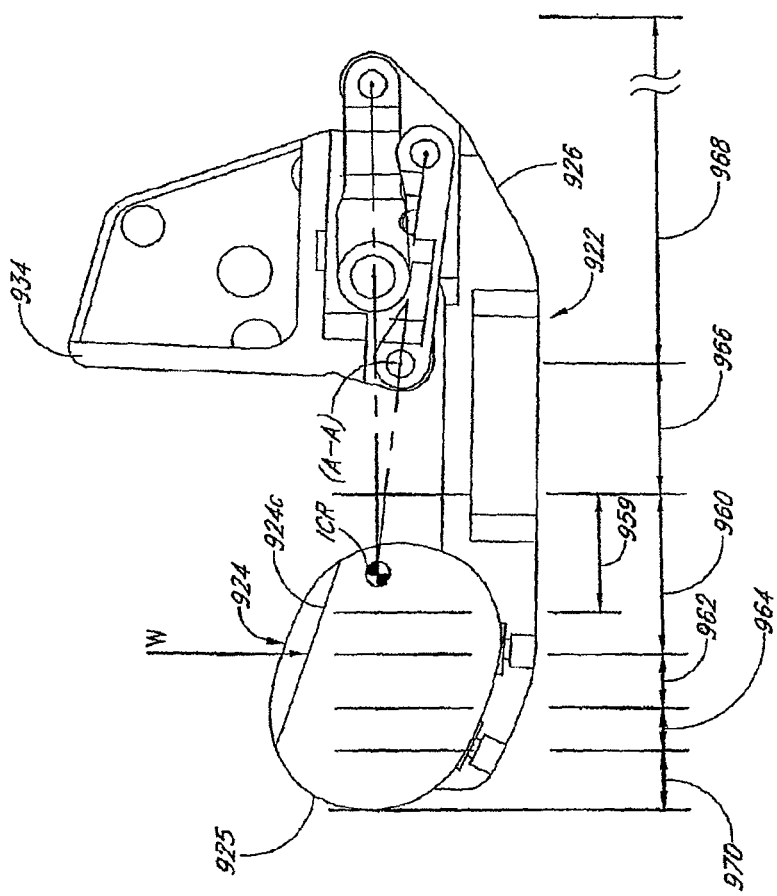

RETRACTABLE VEHICLE STEP

RELATED APPLICATIONS

This application is a continuation of U.S. patent application Ser. No. 13/445,663, filed Apr. 12, 2012, titled RETRACTABLE VEHICLE STEP, which is a continuation of Ser. No. 12/511,027, filed Jul. 28, 2009, titled RETRACTABLE VEHICLE STEP, now U.S. Pat. No. 8,157,277, which is a continuation of U.S. patent application Ser. No. 12/143,559, filed Jun. 20, 2008, titled RETRACTABLE VEHICLE STEP, now U.S. Pat. No. 7,566,064, which is a continuation of U.S. patent application Ser. No. 11/182,267, filed Jul. 15, 2005, titled RETRACTABLE VEHICLE STEP, now U.S. Pat. No. 7,398,985, which is a continuation of U.S. patent application Ser. No. 10/993,047, filed Nov. 19, 2004, titled RETRACTABLE VEHICLE STEP, now U.S. Pat. No. 7,007,961, which is a continuation of U.S. patent application Ser. No. 10/274,418, filed Oct. 16, 2002, titled RETRACTABLE VEHICLE STEP, now U.S. Pat. No. 6,834,875, which claims the benefit of U.S. Provisional Patent Application Ser. No. 60/350,129, filed Oct. 16, 2001, titled RETRACTABLE VEHICLE STEP, and of U.S. Provisional Patent Application Ser. No. 60/404,353, filed Aug. 15, 2002, titled RETRACTABLE VEHICLE STEP; and U.S. patent application Ser. No. 12/511,027, filed Jul. 28, 2009, is also a continuation-in-part of U.S. patent application Ser. No. 12/143,619, filed Jun. 20, 2008, titled RETRACTABLE VEHICLE STEP, now U.S. Pat. No. 7,584,975, which is a continuation of U.S. patent application Ser. No. 11/417,395, filed May 3, 2006, titled RETRACTABLE VEHICLE STEP, now U.S. Pat. No. 7,413,204, which is a continuation of U.S. patent application Ser. No. 10/996,125, filed Nov. 23, 2004, titled RETRACTABLE VEHICLE STEP, now U.S. Pat. No. 7,055,839, which is a continuation of U.S. patent application Ser. No. 10/689,254, filed Oct. 20, 2003, titled RETRACTABLE VEHICLE STEP, now U.S. Pat. No. 6,830,257, which is a continuation of U.S. patent application Ser. No. 09/817,897, filed Mar. 26, 2001, titled RETRACTABLE VEHICLE STEP, now U.S. Pat. No. 6,641,158, which claims the benefit of U.S. Provisional Application No. 60/269,286, filed Feb. 15, 2001, titled RETRACTABLE VEHICLE STEP and of U.S. Provisional Application No. 60/274,417, filed Mar. 8, 2001, titled RETRACTABLE VEHICLE STEP. The entire contents of the above-mentioned patent applications and each of the above-mentioned provisional patent applications are hereby incorporated by reference herein and made a part of this specification.

BACKGROUND OF THE INVENTION

1. Field of the Invention

This invention relates generally to a stepping assist for motor vehicles. In particular, the invention relates to a retractable vehicle step which is movable between a retracted or storage position and an extended position in which it functions as a step assist into the vehicle.

2. Description of the Related Art

It is commonly known to add a running board or similar fixed stepping assist to the side of a motor vehicle, especially to a vehicle with a relatively high ground clearance. However, these fixed running boards and other stepping assists have had several drawbacks. First, a fixed running board is often too high to act as a practical stepping assist and is therefore not very effective in reducing the initial step height for the vehicle user. In addition, when using a relatively high running board, the user is likely to hit his or her head while climbing into the vehicle cab. Furthermore, a fixed running board often extends a significant distance from the side of the vehicle, and can be a source of dirt or grime that rubs onto the user's pants or other clothing as the user steps out of the vehicle onto the ground surface. Such a fixed running board is also frequently struck when the owner of an adjacent parked vehicle opens his door. Finally, a fixed running board or step reduces the ground clearance of a vehicle, and can often be damaged or torn off entirely when the vehicle is used for offroad driving.

Accordingly, a vehicle step which overcomes the above-stated problems is desired.

SUMMARY OF THE INVENTION

In accordance with one embodiment, a retractable step for use with a vehicle comprises a stepping member having a stepping deck, a first arm, a second arm, a motor and a stop. The first arm has a first end pivotally attached to the vehicle, and a second end pivotally attached to the stepping member. The second arm also has a first end pivotally attached to the vehicle, and a second end pivotally attached to the stepping member. The motor is drivingly connected to the first arm such that a rotation of the motor causes rotation of the first arm about its first end and moves the stepping member from a retracted position to an extended position, or vice versa. The stop is located within the range of motion of the second arm such that the second arm bears against the stop when the stepping member is in the extended position. The first and second arms are situated such that the first arm is loaded in compression and the second arm is loaded in tension when the stepping member is in the extended position and a load is placed upon it.

In accordance with another embodiment, a retractable vehicle step assist comprises a rigid frame, a forward planar linkage pivotably connected to the frame along a forward upper connection width, and a rearward planar linkage pivotably connected to the frame along a rearward upper connection width. The retractable vehicle step further comprises a rigid step member having a stepping deck. The step member is pivotably connected to the forward planar linkage along a forward lower connection width, and is pivotably connected to the rearward planar linkage along a rearward lower connection width and on a side of the forward planar linkage opposite the stepping deck. The stepping deck is substantially wider than any of the forward upper connection width, the rearward upper connection width, the forward lower connection width, and the rearward lower connection width.

In accordance with yet another embodiment a retractable vehicle step assist for use with a vehicle having two adjacent doors through which persons may enter the vehicle, comprises a rigid frame, a step member having a stepping deck, and at least two rigid arms connecting the step member to the frame and allowing the step member to move between a retracted position near the frame to a deployed position downward and away from the frame. The stepping deck is of sufficient width to provide a step for persons desiring to enter either of the doors.

In accordance with still another embodiment, a retractable vehicle step assist for use with a vehicle having two adjacent doors through which persons may enter the vehicle, comprises a rigid frame and a step member having a stepping deck. The retractable step assist further comprises at least two rigid arms connecting the step member to the frame and allowing the step member to move between a retracted position near the frame to a deployed position downward and away from the frame. The stepping deck extends in front of each of the doors when in the deployed position.

In accordance with still another embodiment, a retractable vehicle step assist comprises a rigid frame, a step member having a stepping deck, and at least two rigid arms connecting the step member to the frame and allowing the step member to move between a retracted position near the frame to a deployed position downward and away from the frame. The stepping deck is substantially wider than the frame.

In accordance with still another embodiment, a retractable vehicle step assist comprises a rigid frame, a step member having a stepping deck, and a forward rigid arm and a rearward rigid arm connecting the step member to the frame and allowing the step member to move between a retracted position near the frame to a deployed position downward and away from the frame. The step member is pivotably connected to the rearward rigid arm at a rearward pivotable connection and the step member rotates downward about the rearward pivotable connection as the step member moves to the deployed position.

In accordance with still another embodiment, a retractable vehicle step assist comprises a rigid frame, a step member having a stepping deck, and at least two rigid arms connecting the step member to the frame and allowing the step member to move between a retracted position near the frame to a deployed position downward and away from the frame. The stepping member further comprises a support bracket rigidly connected to the stepping deck and connected to the arms opposite the stepping deck. The support bracket is oriented at an angle to the stepping deck.

In accordance with still another embodiment, a method of improving access to a vehicle through a door of the vehicle, comprises attaching a rigid frame to the vehicle, and connecting a stepping member having a stepping deck to the frame via at least two rigid arms. This is done so that the stepping member is moveable between a retracted position near the frame to a deployed position wherein the stepping deck is situated along the side of the vehicle below the door. In the method the stepping deck is substantially wider than the frame.

In accordance with another embodiment, there is provided a retractable step for a vehicle having a body with a lower edge. The step comprises a rigid frame configured for attachment to the vehicle so that substantially all of the frame is behind the lower edge of the body, a rotatable linkage connected to the frame, and a step member connected to the rotatable linkage opposite the frame. The step member has a deployed position, and a retracted position in which the step member and the rotatable linkage are located behind the lower edge of the body.

In accordance with another embodiment, there is provided a vehicle which comprises a body having a lower edge and a retractable step assist attached to the vehicle. The retractable step assist comprises a rigid frame attached to the vehicle so that substantially all of the frame is behind the lower edge of the body, a rotatable linkage connected to the frame, and a step member connected to the rotatable linkage opposite the frame. The step member has a deployed position, and a retracted position in which the step member and the rotatable linkage are located behind the lower edge of the body.

In accordance with another embodiment, there is provided a retractable vehicle step assist configured for attachment to a vehicle. The step assist comprises a rigid frame, a step member having a stepping deck, and a rotatable linkage. The linkage connects the step member to the frame and allows the step member to move between a deployed position and a retracted position in which an upper surface of the stepping deck is substantially concealed from the view of an adult standing outside the vehicle.

In accordance with another embodiment, there is provided a retractable step for a vehicle having a body with an under panel. The step comprises a rigid frame configured for attachment to the vehicle, a rotatable linkage connected to the frame and a step member connected to the rotatable linkage opposite the frame. The step member has a stepping deck with an upper surface. The step member has a deployed position, and a retracted position in which the upper surface of the stepping deck is substantially flush with the under panel.

In accordance with another embodiment, there is provided a retractable vehicle step assist configured for attachment to a vehicle. The step assist comprises a rigid frame, a step member having a stepping deck, and a rotatable linkage. The linkage connects the step member to the frame and allows the step member to move between a deployed position and a retracted position in which only a forward edge of the stepping deck is visible to an adult standing outside the vehicle.

In accordance with another embodiment, there is provided a retractable step for a vehicle having an underbody with a substantially vertical outer surface. The step comprises a rigid frame configured for attachment to the vehicle, a linkage connected to the frame, and a step member connected to the linkage opposite the frame. The step member has a deployed position, and a retracted position in which a forward edge of the step member is spaced rearward from the outer surface of the underbody by at least 1.5 inches.

In accordance with another embodiment, there is provided a retractable step for a vehicle having a body with a lower edge. The step comprises a rotatable linkage connectable to the vehicle, and a step member connected to the rotatable linkage. The step member has a deployed position, and a retracted position in which the step member and the rotatable linkage are located behind the lower edge of the body.

In accordance with another embodiment, there is provided a vehicle, comprising a body having a lower edge, and a retractable step assist attached to the vehicle. The retractable step assist comprises a rotatable linkage connected to the vehicle, and a step member connected to the rotatable linkage. The step member has a deployed position, and a retracted position in which the step member and the rotatable linkage are located behind the lower edge of the body.

In accordance with another embodiment, there is provided a retractable step for a vehicle having an underbody with a substantially vertical outer surface. The step comprises a linkage connectable to the vehicle, and a step member connected to the linkage. The step member has a deployed position, and a retracted position in which a forward edge of the step member is spaced rearward from the outer surface of the underbody by at least 1.5 inches.

In accordance with another embodiment, a retractable step for a vehicle comprises a forward linkage having an upper portion connectable to the vehicle so as to be rotatable about a first axis, and a rearward linkage having an upper portion connectable to the vehicle so as to be rotatable about a second axis. The second axis is located rearward of the first axis, and the first and second axes are oriented generally parallel to a longitudinal axis of the vehicle. The step further comprises a step member connected to the forward and rearward linkage so as to be movable between a retracted position and an extended position. At least a portion of the rearward linkage extends forward of the first axis when the step member is in the extended position.

In accordance with another embodiment, a retractable step for a vehicle comprises a first arm having an upper portion rotatably fixable with respect to an underside of the vehicle so as to be rotatable about a first axis of rotation oriented generally parallel to an adjacent lower edge of the vehicle. The step further comprises a second arm having an upper portion rotatably fixable with respect to an underside of the vehicle so as to be rotatable about a second axis of rotation oriented generally parallel to an adjacent lower edge of the vehicle and located rearward of the first axis. The step further comprises a step member connected to the first and second arms so as to be movable between a retracted position near the underside of the vehicle and an extended position remote from the underside. At least a portion of the second arm extends forward of the first axis when the step member is in the extended position.

In accordance with another embodiment, a retractable step for a vehicle comprises a first arm having an upper portion rotatably fixable with respect to an underside of the vehicle so as to be rotatable about a first axis of rotation, and a second arm having an upper portion rotatably fixable with respect to an underside of the vehicle so as to be rotatable about a second axis of rotation. The step further comprises a step member connected to the first and second arms so as to be movable between a retracted position under the vehicle and an extended position extending outward from the vehicle. At least one of the first arm and the second arm further comprises a stop member which extends toward the other of the first arm and the second arm and contacts the other arm when the step member is in the extended position.

In accordance with another embodiment, a retractable step for a vehicle comprises a first arm having an upper portion rotatably mountable to an underside of the vehicle so as to be rotatable about a first axis of rotation oriented generally parallel to an adjacent lower edge of the vehicle, and a second arm having an upper portion rotatably mountable to an underside of the vehicle so as to be rotatable about a second axis of rotation oriented generally parallel to an adjacent lower edge of the vehicle and located rearward of the first axis. The step further comprises a step member connected to the first and second arms so as to be movable between a retracted position at least substantially entirely under the vehicle and an extended position extending outward from the vehicle. The step member comprises a stepping deck defining an upper surface thereof and a connection region which is located rearward and upward from the stepping deck when the step member is in the extended position, and wherein at least one of the first and second arms is connected to the step member at the connection region. It is believed that this overall arrangement facilitates storing the step out of sight, while enabling the final deployment movement of the step to include a downward rotational component about a third axis at the lower end of the first arm. It is believed that this arrangement facilitates self-energizing of the step. That is, when a load is placed on the step, the step continues its downward rotational movement somewhat, so that the load is not carried by any motor driving the step.

In accordance with another embodiment, a retractable step for a vehicle comprises a first arm having an upper portion rotatably mountable to an underside of the vehicle so as to be rotatable about a first axis of rotation, and a second arm having an upper portion rotatably mountable to an underside of the vehicle so as to be rotatable about a second axis of rotation oriented generally parallel to the first axis. The step further comprises a step member connected to the first and second arms so as to be movable between a retracted position at least substantially entirely under the vehicle and an extended position extending outward from the vehicle. The first arm is connected to the step member so as to be rotatable about a third axis and the second arm is connected to the step member so as to be rotatable about a fourth axis, the third and fourth axes being oriented generally parallel to the first and second axes. Desirably, the distance between the third and fourth axes is less than 6 inches, more desirably less than 4 inches and, most desirably, less than 2 inches. The axes are arranged according to a first aspect ratio, which comprises a ratio of (1) the distance between the third axis and the fourth axis and (2) the distance between the first axis and the third axis, and the first aspect ratio is less than 0.4 and, preferably, less than 0.3. It is believed that these distances and ratios facilitate the ability to permit the step to be stored in a small envelope out of sight and to yet be deployable to the desired deployment position.

In accordance with another embodiment, a retractable vehicle step assist comprises a rigid frame, a forward planar linkage pivotably connected to the frame along a forward upper connection width, and a rearward planar linkage pivotably connected to the frame along a rearward upper connection width. The step further comprises a rigid step member having a stepping deck. The step member is pivotably connected to the forward planar linkage along a forward lower connection width, and pivotably connected to the rearward planar linkage along a rearward lower connection width and on a side of the forward planar linkage opposite the stepping deck. The stepping deck is substantially wider than any of the forward upper connection width, the rearward upper connection width, the forward lower connection width, and the rearward lower connection width.

In accordance with another embodiment, a retractable vehicle step assist for use with a vehicle having two adjacent doors through which persons may enter the vehicle, comprises a rigid frame, and a step member having a stepping deck. The step assist further comprises at least two rigid arms connecting the step member to the frame and allowing the step member to move between a retracted position near the frame to a deployed position downward and away from the frame. The stepping deck is of sufficient width to provide a step for persons desiring to enter either of the doors.

In accordance with another embodiment, a retractable vehicle step assist for use with a vehicle having two adjacent doors through which persons may enter the vehicle, comprises a rigid frame, and a step member having a stepping deck. The step further comprises at least two rigid arms connecting the step member to the frame and allowing the step member to move between a retracted position near the frame to a deployed position downward and away from the frame. The stepping deck extends in front of each of the doors when in the deployed position.

In accordance with another embodiment, a retractable vehicle step assist comprises a rigid frame, a step member having a stepping deck, and at least two rigid arms connecting the step member to the frame and allowing the step member to move between a retracted position near the frame to a deployed position downward and away from the frame. The stepping deck is substantially wider than the frame.

In accordance with another embodiment, a retractable vehicle step assist comprises a rigid frame, and a step member having a stepping deck. The step further comprises a forward rigid arm and a rearward rigid arm connecting the step member to the frame and allowing the step member to move between a retracted position near the frame to a deployed position downward and away from the frame. The step member is pivotably connected to the rearward rigid arm at a rearward pivotable connection and the step member rotates downward about the rearward pivotable connection as the step member moves to the deployed position.

In accordance with another embodiment, a retractable vehicle step assist comprises a rigid frame, a step member having a stepping deck, and at least two rigid arms connecting the step member to the frame and allowing the step member to move between a retracted position near the frame to a deployed position downward and away from the frame. The stepping member further comprises a support bracket rigidly connected to the stepping deck and connected to the arms opposite the stepping deck, the support bracket being oriented at an angle to the stepping deck.

In accordance with another embodiment, a method of improving access to a vehicle through a door of the vehicle, comprises attaching a rigid frame to the vehicle, connecting a stepping member having a stepping deck to the frame via at least two rigid arms so that the stepping member is moveable between a retracted position near the frame to a deployed position wherein the stepping deck is situated along the side of the vehicle below the door. The stepping deck is substantially wider than the frame.

In accordance with another embodiment, a retractable vehicle step assist comprises a first unitary support arm defining an inboard surface and an outboard surface. A maximum distance between the inboard surface and the outboard surface defines a first thickness, and the first arm defines a substantially vertical first side and a substantially vertical second side. A maximum distance between the first side and the second side defines a first width, and the first width is substantially greater than the first thickness. The retractable vehicle step assist further comprises a second unitary support arm defining an inboard surface and an outboard surface. A maximum distance between the inboard surface and the outboard surface defines a second thickness, and the second arm defines a substantially vertical first side and a substantially vertical second side. A maximum distance between the first side and the second side defines a second width, and the second width is substantially greater than the second thickness. The first support arm and the second support arm are connectable with respect to an underside of a vehicle so as to be pivotable about a first axis oriented generally parallel to the ground and a second axis oriented generally parallel to the ground, respectively. The retractable vehicle step further comprises a static stop member located within a range of motion of one of the first support arm and the second support arm. The retractable vehicle step further comprises a step member having a support bracket and a stepping deck rigidly connected to the support bracket. The stepping deck has an upper surface, and the first support arm and the second support arm are connected to the support bracket opposite the stepping deck so that the first support arm and the second support arm are pivotable with respect to the step member about a third axis and a fourth axis, respectively. The fourth axis is located inboard from the third axis. The first axis is spaced from the third axis by a first distance, the second axis is spaced from the fourth axis by a second distance, the first axis is spaced from the second axis by a third distance, and the third axis is spaced from the fourth axis by a fourth distance, as the step assist is viewed in a plane perpendicular to said first axis, and the third distance and the fourth distance are unequal. The first support arm and the second support arm allow the step member and the stepping deck to move between a retracted position and a deployed position downward and outboard from the retracted position. When the step member is in the deployed position, the support bracket extends inboard and upward from the stepping deck and the upper surface of the stepping deck is the uppermost portion of the step member outboard of the support bracket. The entirety of the stepping deck is located outboard of the first axis when the step member is in the deployed position and at least a portion of the stepping deck is located inboard of the second axis when the step member is in the retracted position. The static stop member, the first support arm, the second support arm and the step member are sufficient to maintain the stepping deck in the deployed position when a user steps onto the stepping deck. In a further embodiment, the first distance and the second distance may be unequal.

In accordance with another embodiment, a retractable vehicle step assist comprises a first unitary support arm defining an inboard surface and an outboard surface. A maximum distance between the inboard surface and the outboard surface defines a first thickness, and the first arm defines a substantially vertical first side and a substantially vertical second side. A maximum distance between the first side and the second side defines a first width, and the first width is substantially greater than the first thickness. The retractable vehicle step assist further comprises a second unitary support arm defining an inboard surface and an outboard surface. A maximum distance between the inboard surface and the outboard surface defines a second thickness, and the second arm defines a substantially vertical first side and a substantially vertical second side. A maximum distance between the first side and the second side defines a second width, and the second width is substantially greater than the second thickness. The first support arm and the second support arm are connectable with respect to an underside of a vehicle so as to be pivotable about a first axis oriented generally parallel to the ground and a second axis oriented generally parallel to the ground, respectively. The retractable vehicle step further comprises a static stop member located within a range of motion of one of the first support arm and the second support arm. The retractable vehicle step further comprises a step member having a support bracket and a stepping deck rigidly connected to the support bracket. The stepping deck has an upper surface, and the first support arm and the second support arm are connected to the support bracket opposite the stepping deck so that the first support arm and the second support arm are pivotable with respect to the step member about a third axis and a fourth axis, respectively. The fourth axis is located inboard from the third axis. The first axis is spaced from the third axis by a first distance, the second axis is spaced from the fourth axis by a second distance, the first axis is spaced from the second axis by a third distance, and the third axis is spaced from the fourth axis by a fourth distance, as the step assist is viewed in a plane perpendicular to said first axis, and the third distance and the fourth distance are unequal. The first support arm and the second support arm allow the step member and the stepping deck to move between a retracted position and a deployed position downward and outboard from the retracted position. The static stop member, the first support arm, the second support arm and the step member are sufficient to maintain the stepping deck in the deployed position when a user steps onto the stepping deck. In a further embodiment, the first distance and the second distance may be unequal. In a further embodiment, the entirety of the stepping deck is located outboard of the first axis when the step member is in the deployed position and at least a portion of the stepping deck is located inboard of the second axis when the step member is in the retracted position.

In accordance with another embodiment, a retractable vehicle step assist comprises a first support arm and a second support arm. The first support arm and the second support arm are connectable with respect to an underside of a vehicle so as to be pivotable about a first axis oriented generally parallel to the ground and a second axis oriented generally parallel to the ground, respectively. The step assist further comprises a step member having a support bracket and a stepping deck rigidly connected to the support bracket. The first support arm and the second support arm are connected to the support bracket opposite the stepping deck so that the first support arm and the second support arm are pivotable with respect to the step member about a third axis and a fourth axis, respectively. The fourth axis is located inboard from the third axis. The first support arm and the second support arm allow the step member and the stepping deck to move between a retracted position and a deployed position downward and outboard from the retracted position. The first support arm has an upper portion and a lower portion interconnected by an intermediate portion. The intermediate portion is thinner than at least one of the upper portion and the lower portion, and is located such that the support arms can rotate about the first and second axes to a point at which a portion of the second support arm is spaced from a line connecting the first and third axes by an orthogonal distance less than half the maximum thickness of the first support arm.

In accordance with another embodiment, a retractable vehicle step assist comprises a first support arm and a second support arm. The first support arm and the second support arm are connectable with respect to an underside of a vehicle so as to be pivotable about a first axis oriented generally parallel to the ground and a second axis oriented generally parallel to the ground, respectively. The step assist further comprises a step member having a support bracket and a stepping deck rigidly connected to the support bracket. The first support arm and the second support arm are connected to the support bracket opposite the stepping deck so that the first support arm and the second support arm are pivotable with respect to the step member about a third axis and a fourth axis, respectively. The fourth axis is located inboard from the third axis. The first support arm and the second support arm allow the step member and the stepping deck to move between a retracted position and a deployed position downward and outboard from the retracted position. The first support arm has an upper portion and a lower portion interconnected by an intermediate portion. The intermediate portion is thinner than the at least one of the upper portion and the lower portion. The intermediate portion contacts the second support arm when the step member is in at least one of the retracted position and the deployed position.

In accordance with another embodiment, a retractable vehicle step assist comprises a first support arm and a second support arm. The first support arm and the second support arm are connectable with respect to an underside of a vehicle so as to be pivotable about a first axis oriented generally parallel to the ground and a second axis oriented generally parallel to the ground, respectively. The step assist further comprises a step member having a support bracket and a stepping deck rigidly connected to the support bracket. The first support arm and the second support arm are connected to the support bracket opposite the stepping deck so that the first support arm and the second support arm are pivotable with respect to the step member about a third axis and a fourth axis, respectively. The fourth axis is located inboard from the third axis. The first support arm and the second support arm allow the step member and the stepping deck to move between a retracted position and a deployed position downward and outboard from the retracted position. The first and second arms have a bent configuration such that the arms can rotate about the first and second axes to a point at which a line connecting the first and third axes intersects a portion of the second arm near the second axis.

In accordance with another embodiment, a retractable vehicle step assist comprises a first support arm and a second support arm. The first support arm and the second support arm are connectable with respect to an underside of a vehicle so as to be pivotable about a first axis oriented generally parallel to the ground and a second axis oriented generally parallel to the ground, respectively. The step assist further comprises a step member having a support bracket and a stepping deck rigidly connected to the support bracket. The first support arm and the second support arm are connected to the support bracket opposite the stepping deck so that the first support arm and the second support arm are pivotable with respect to the step member about a third axis and a fourth axis, respectively. The fourth axis is located inboard from the third axis. The first support arm and the second support arm allow the step member and the stepping deck to move between a retracted position and a deployed position downward and outboard from the retracted position. At least a portion of the stepping deck is located above the first axis when the stepping deck is in the retracted position. The first axis is spaced from the third axis by a first distance, and the second axis is spaced from the fourth axis by a second distance, as the step assist is viewed in a plane perpendicular to said first axis, and the first distance and the second distance are unequal.

In accordance with another embodiment, a retractable vehicle step assist comprises a first support arm and a second support arm. The first support arm and the second support arm connectable with respect to an underside of a vehicle so as to be pivotable about a first axis oriented generally parallel to the ground and a second axis oriented generally parallel to the ground, respectively. The step assist further comprises a step member having an upper stepping surface. The first support arm and the second support arm are connected to the step member so that the first support arm and the second support arm are pivotable with respect to the step member about a third axis and a fourth axis, respectively. The fourth axis is located inboard from the third axis. The first support arm and the second support arm allow the step member to move between a retracted position and a deployed position downward and outboard from the retracted position. As the step assist is viewed in a plane perpendicular to said first axis, the first axis and the third axis define a first line and the second axis and the fourth axis define a second line. The first line and the second line intersect at an instantaneous center of rotation of the step member. When the step member is in the retracted position, the instantaneous center of rotation is located at or inboard of the upper stepping surface.

In accordance with another embodiment, a retractable vehicle step assist comprises a first support arm and a second support arm. The first support arm and the second support arm are connectable with respect to an underside of a vehicle so as to be pivotable about a first axis oriented generally parallel to the ground and a second axis oriented generally parallel to the ground, respectively. The step assist further comprises a step member having an upper stepping surface. The first support arm and the second support arm are connected to the step member so that the first support arm and the second support arm are pivotable with respect to the step member about a third axis and a fourth axis, respectively. The fourth axis is located inboard from the third axis. The first support arm and the second support arm allow the step member to move between a retracted position and a deployed position downward and outboard from the retracted position. At least a portion of the upper stepping surface initially moves upward as the step member moves from the retracted position to the deployed position.

In accordance with another embodiment, a retractable vehicle step assist comprises a first support arm and a second support arm. The first support arm and the second support arm are connectable with respect to an underside of a vehicle so as to be pivotable about a first axis oriented generally parallel to the ground and a second axis oriented generally parallel to the ground, respectively. The step assist further comprises a step member having an upper stepping surface. The first support arm and the second support arm are connected to the step member so that the first support arm and the second support arm are pivotable with respect to the step member about a third axis and a fourth axis, respectively. The fourth axis is located inboard from the third axis. The first support arm and the second support arm allow the step member to move between a retracted position and a deployed position downward and outboard from the retracted position. The upper stepping surface follows a deployment path as said step member moves from said retracted position to said deployed position. The deployment path includes an initial upward component.

All of these and other embodiments are intended to be within the scope of the invention herein disclosed. This and other embodiments of the present invention will become readily apparent to those skilled in the art from the following detailed description of the preferred embodiments having reference to the attached figures, the invention not being limited to any particular preferred embodiment or embodiments disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 10 is a perspective view of a clutch assembly for use in connection with the retractable vehicle step;

FIG. 11 is an exploded perspective view of the clutch assembly of FIG. 10;

FIG. 12 is a perspective view of a further embodiment of the retractable vehicle step, in the deployed position; and FIG. 13 is a perspective view of the embodiment of FIG. 12, in the retracted position.

FIG. 22A is a further side sectional view of the embodiment of FIG. 22.

DETAILED DESCRIPTION OF THE PREFERRED EMBODIMENTS

As a preliminary matter, it should be noted that the terms "forward," "front" and "outboard" are used interchangeably herein, as are the terms "rearward," "rear" and "inboard," when describing components of the step structures disclosed herein. These terms are to be understood with reference to a direction of ingress into a vehicle, "forward"/"front"/"outboard" meaning generally toward the exterior of the vehicle, and "rearward"/"rear"/"inboard" meaning generally toward the interior of the vehicle.

Figure 1:
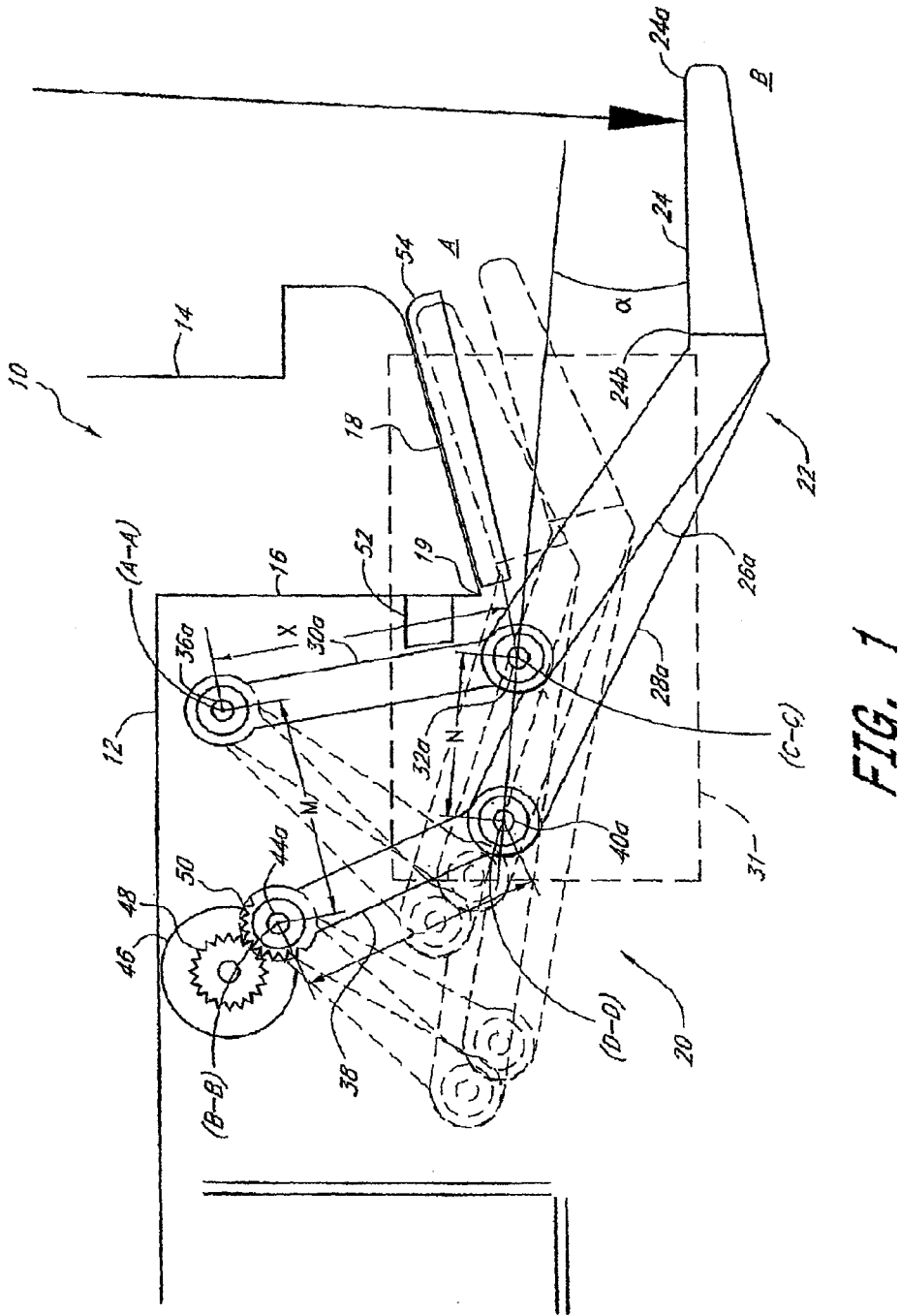
FIG. 1 is a side elevation view of a retractable vehicle step in accordance with one preferred embodiment of the invention.
Figure 2:
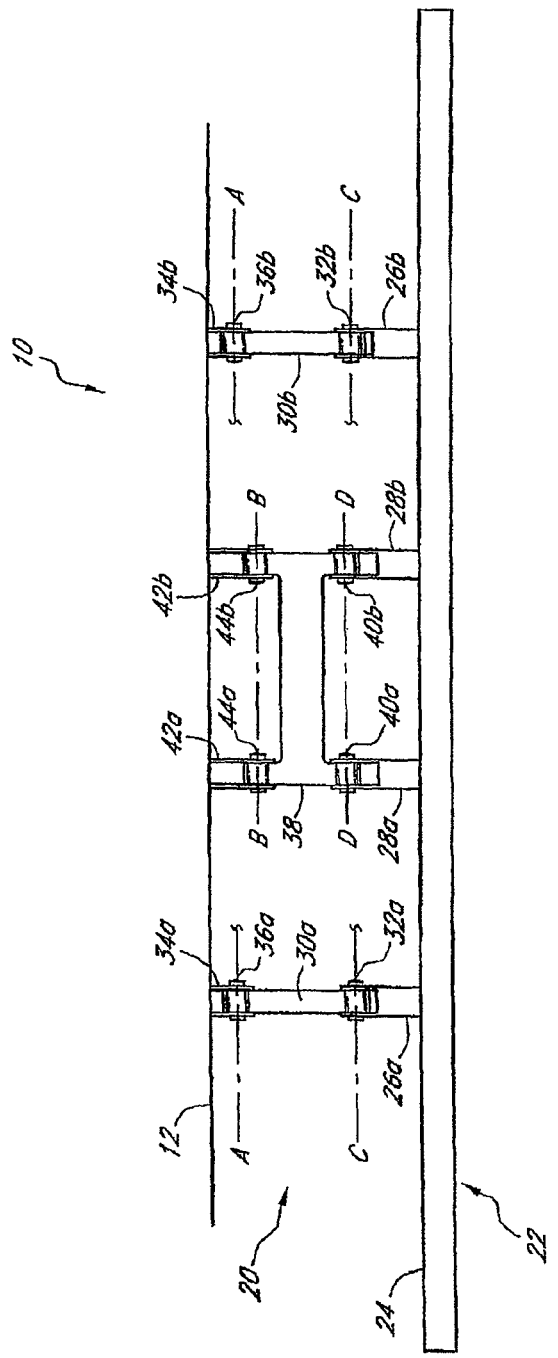
FIG. 2 is a front elevation view of the retractable vehicle step of FIG. 1.

FIGS. 1 and 2 depict the lower portion of a vehicle 10 having an underbody 12, an exterior 14, a vertical underbody portion 16 and an under panel 18. A retractable vehicle step 20 is shown associated with the vehicle 10. Referring specifically to FIG. 2, the retractable vehicle step 20 has a stepping member 22, which consists of a stepping deck 24 with an outboard end 24a, an inboard end 24b, integrally formed support brackets 26a, 26b, and drive brackets 28a, 28b located inward of the support brackets 26a, 26b. The support brackets 26a, 26b are pivotally connected to support arms 30a, 30b via clevis pins 32a, 32b, at an end of the support brackets 26a, 26b opposite the stepping deck 24. Similarly, the support arms 30a, 30b are pivotally connected to anchor brackets 34a, 34b via clevis pins 36a, 36b, at an end of each support arm opposite the support brackets 26a, 26b. The anchor brackets 34a, 34b are rigidly connected to the underbody 12 by welding, bolting, riveting or other techniques known to those skilled in the art.

The drive brackets 28a, 28b of the stepping member 22 are pivotally connected to a drive arm 38 via clevis pins 40a, 40b, at an end of the drive brackets 28a, 28b opposite the stepping deck 24. As best seen in FIG. 2, the drive arm 38 preferably has an H configuration and is pivotally connected to anchor brackets 42a, 42b via clevis pins 44a, 44b at an end of the drive arm 38 opposite the drive brackets 28a, 28b. The anchor brackets 42a, 42b are rigidly connected to the underbody 12 by welding, bolting, riveting or other techniques known to those skilled in the art.

Accordingly, the retractable vehicle step 20 defines the following axes of rotation, best seen in FIG. 2: a first axis A-A about which the support arms 30a, 30b rotate with respect to the underbody 12 and/or anchor brackets 34a, 34b; a second axis B-B about which the drive arm 38 rotates with respect to the underbody 12 and/or anchor brackets 42a, 42b; a third axis C-C about which the support arms 30a, 30b and support brackets 26a, 26b rotate with respect to each other; and a fourth axis D-D about which the drive arm 38 and the drive brackets 28a, 28b rotate with respect to each other. FIG. 1, as a side elevation view of FIG. 2, depicts the axes A-A, B-B, C-C, D-D as points. The first axis A-A is spaced from the third axis C-C by a first distance X and the second axis B-B is spaced from the fourth axis D-D by a second distance Y. (In other words, the first axis A-A is spaced from the rotatable connection of the support arms 30a, 30b to the step member 22 by the first distance X, and the second axis B-B is spaced from the rotatable connection of the drive arm 38 to the step member 22 by the second distance Y.) In one embodiment, the first and second distances X, Y are unequal; in another embodiment the first distance X is greater than the second distance Y. In one embodiment, the first axis A-A is located upward from the second axis B-B.

The first axis of rotation A-A is oriented generally parallel to the ground and/or a lower edge 19 of the vertical underbody portion 16, and the second axis of rotation B-B is also oriented generally parallel to the ground and/or the lower edge 19. (It should be understood that, as used herein, "parallel to the ground" means generally parallel to a riding plane of the vehicle upon which the retractable step is mounted, which riding plane intercepts the contact patch of the two wheels on the side of the vehicle on which the retractable step in question is mounted.) The third and fourth axes C-C, D-D are oriented generally parallel to the first and second axes A-A, B-B.

With further reference to FIG. 1, the first axis A-A is spaced from the second axis B-B by a third distance M and the third axis C-C is spaced from the fourth axis D-D by a fourth distance N. In one embodiment, the third and fourth distances M, N are unequal; in another embodiment the third distance M is greater than the second distance N. In one embodiment, a line connecting the first axis A-A and the third axis C-C is non-parallel to a line connecting the second axis B-B and the fourth axis D-D when the retractable vehicle step 20 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 20 is in the deployed position.

In one embodiment, as seen in FIG. 1, a first aspect ratio may be defined as the ratio between (1) the distance between the first and second axes A-A, B-B and (2) the length of the arms 30a, 30b as defined by the distance between the first and third axes A-A, C-C. In the embodiment shown in FIG. 1, the first aspect ratio is about 0.76. Likewise, a second aspect ratio may be defined as the ratio between (1) the distance between the first and second axes A-A, B-B and (2) the length of the drive arm 38 as defined by the distance between the second and fourth axes B-B, D-D. In the embodiment shown in FIG. 1, the second aspect ratio is about 0.91. A third aspect ratio may be defined as the ratio between (1) the distance between the first and second axes A-A, B-B and (2) the distance between the third and fourth axes C-C, D-D. In the embodiment shown in FIG. 1, the third aspect ratio is about 1.32.

With reference now to FIG. 1, a motor 46 is rigidly mounted to the underbody 12 on a mounting bracket (not shown) adjacent the retractable vehicle step 20. The motor 46 turns a pinion gear 48 about an axis roughly parallel to the plane defined by the underbody 12. The pinion gear 48 meshes with drive teeth 50 formed at the end of the drive arm 38. Actuation of the motor 46 causes the pinion gear 48 to rotate and the drive arm 38 to counter-rotate with respect to the motor 46 and pinion gear 48, about the clevis pin 44a. As the drive arm 38 rotates it pushes the stepping member 22 by virtue of its connection to the drive brackets 28a, 28b. Thus, when the motor 46 is caused to rotate, the motor 46 moves the retractable vehicle step 20 between a retracted position A wherein the stepping deck is desirably generally positioned inward from the exterior of the vehicle or fixed running board and an extended position B in which the stepping deck is extended sufficiently to provide a step for at least the forefoot portion of a user's foot. As the retractable vehicle step 20 moves between the retracted position A and the extended position B under the power of the motor 46, the support arms 30a, 30b rotate with respect to the clevis pins 36a, 36b and 32a, 32b and support and guide the motion of the retractable vehicle step 20. The extended position B is reached when the support arms 30a, 30b contact a stop 52 which is preferably mounted on the vertical underbody portion 16. In one embodiment (best seen in FIG. 1), the stepping deck 24 is tilted upward when in the retracted position A, with the outboard end 24a located upward from the inboard end 24b.

When the retractable vehicle step 20 is in the extended position B, a downward force exerted on the stepping deck 24 causes the support arms 30a, 30b to bear against the stop 52. This arrangement causes the load on the stepping deck 24 to be borne primarily by the support brackets 26a, 26b, support arms 30a, 30b and the stop 52. In the extended position B, the retractable vehicle step 20 takes on a geometry such that the support brackets 26a, 26b, and support arms 30a, 30b are loaded in tension. The clevis pins 32a, 32b define a pivot axis of the stepping member 22. The torque generated by a load on the stepping deck 24 is opposed by the drive arm 38, which is thus loaded in axial compression between the clevis pins 40a, 40b and 44a, 44b. Because the clevis pins 44a, 44b are fixed in the anchor brackets 42a, 42b, the motor 46 is isolated from the load on the stepping deck 24.

This aspect of the retractable vehicle step 20 prevents damage to the motor by eliminating "back-loading," as there is no torque reaction about the end of the drive arm 38, even when very heavy loads are placed on the stepping deck 24. Thus the motor 46 is not needed to exert a counter-torque on the drive arm 38 to support the load on the stepping deck 24. This feature also eliminates the need for balky, unreliable clutches or any other means of disconnecting the motor 46 from the retractable vehicle step 20, or retractable stops or the like to engage and support the vehicle step 20 when in the extended position.

The retractable vehicle step 20 functions in this manner when in the extended position B so long as the drive arm 38 is rotated further away from the vertical in a counterclockwise direction (as shown in FIG. 1) than are the support arms 30a, 30b. That is, when the drive arm 38 is parallel to, or displaced clockwise beyond parallel to, the support arms 30a, 30b, the drive arm 38 will not maintain the support arms 30a, 30b against the stop 52. Rather, the retractable vehicle step 20 will tend to move toward the retracted position A, and the drive arm 38 will tend to rotate counterclockwise (in FIG. 1) about the clevis pins 44a, 44b. In this situation the motor 46 would be needed to exert a counter-torque on the drive arm 38, to maintain the retractable vehicle step 20 in the extended position B. As mentioned above, it is undesirable to require the motor 46 to function in this manner.

Advantageously, some or all of the arms 30a, 30b, 38 are connected to the step member 22 within a connection region 31 which is located rearward and upward from the stepping deck 24. This configuration minimizes the length and the downward and forward travel of the arms 30a, 30b, 38 while facilitating a long overall "reach" for the step 20, with convenient placement of the stepping deck 24 when the step is in the extended position. Furthermore, this arrangement permits the use, where desired, of an angled step member 22 (see FIG. 1) which can be retracted against the underbody 12 with minimal loss of ground clearance.

In one embodiment, when the step 20 is viewed from the side, in a plane perpendicular to the first axis (see FIG. 1) the third and fourth axes comprise points in the connection region 31, and a line extending through the points forms an included angle α of about 10 degrees with respect to the upper surface of the stepping deck 24. In another embodiment, the angle α may be between about 5 and 20 degrees. In still other embodiments, the fourth axis may be located anywhere within the connection region 31 rearward and upward of the third axis and the angle α may thus be any angle greater than 0 degrees and less than 90 degrees.

A dust cover or cap 54 may be mounted to the lower body panel 18 to provide a storage location for the stepping member 22 and prevent dust or grime from collecting on the stepping deck 24.

With these features the retractable vehicle step 20 provides a practical stepping assist for a vehicle user, which can be quickly moved into an extended position for use and retracted out of the way when necessary. As detailed above, this functionality is provided with a minimum of mechanical complexity and a high level of reliability. Moreover, the retractable vehicle step 20 is easily connected to a vehicle's existing systems to allow even greater usability. For example, the motor 46 may be connected to the vehicle's electrical system to cause the vehicle step 20 to quickly move to the extended position upon shutting off the vehicle's engine, placing the vehicle in park, opening a door, or signaling the power door-lock system with a remote device or control such as a key fob control. Similarly, the motor 46 may be signaled to retract the vehicle step upon starting the engine, placing the vehicle in drive, closing or locking the door(s) with which the step is associated, etc.

Figure 3:
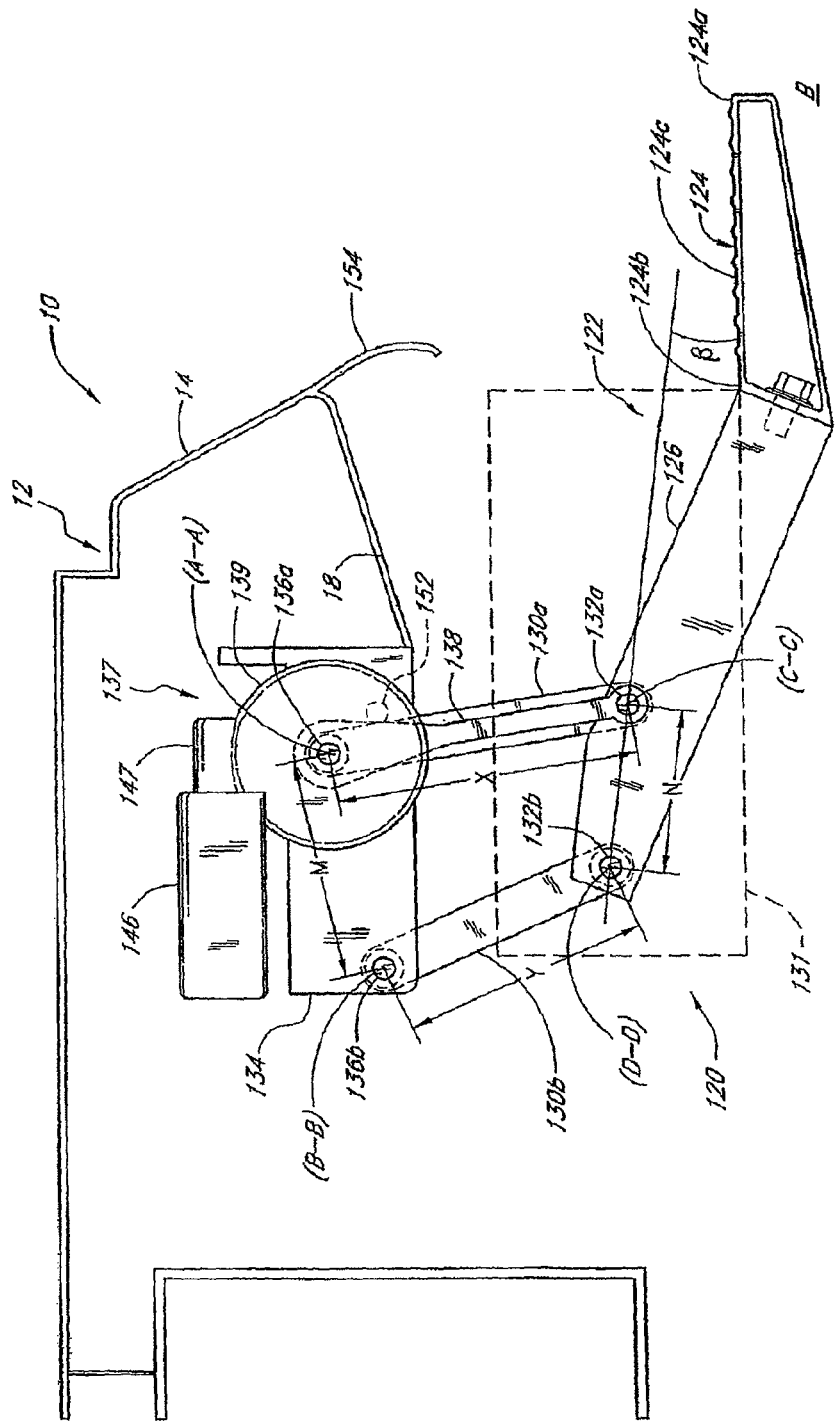
FIG. 3 is a side elevation view of a retractable vehicle step in accordance with another preferred embodiment of the invention, in the deployed position.
Figure 4:
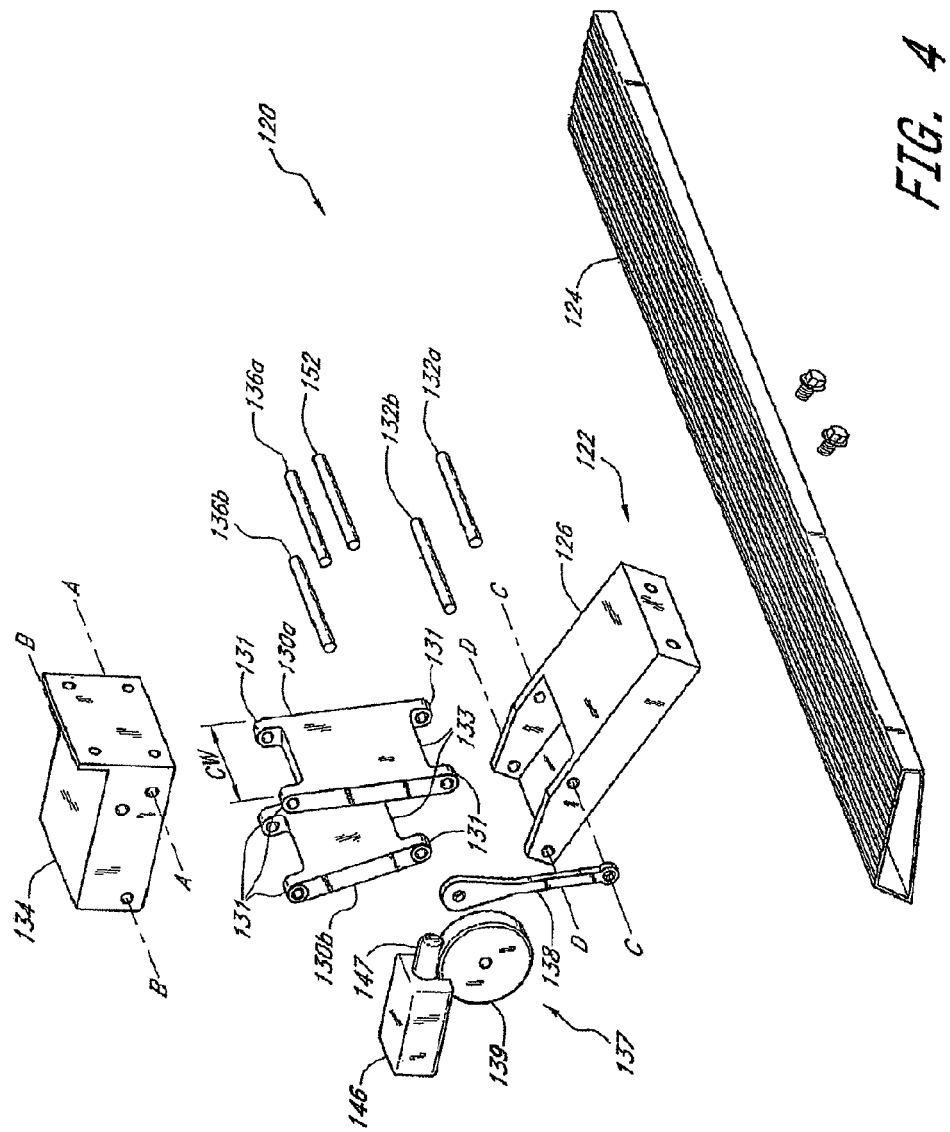
FIG. 4 is an exploded perspective view of the retractable vehicle step of FIG. 3.
Figure 5:
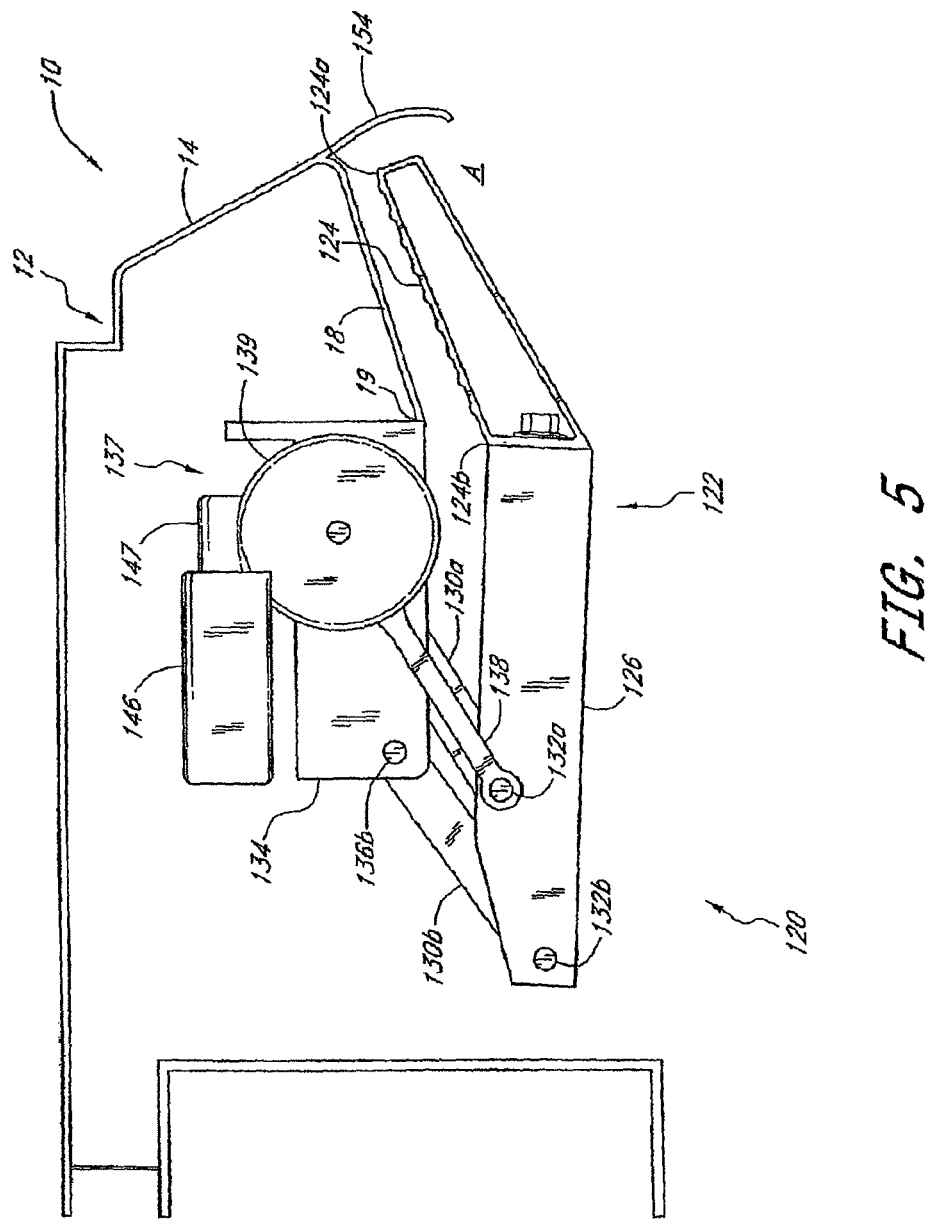
FIG. 5 is a side elevation view of the retractable vehicle step of FIG. 3, in the retracted position.

Another embodiment of a retractable vehicle step 120 is shown in FIGS. 3-5. The retractable step 120 comprises a stepping member 122 that includes a support section or stepping deck 124 bolted or otherwise rigidly connected to an extension section or a support bracket 126. The stepping deck 124 has an outboard end 124a and an inboard end 124b, and defines an upper stepping surface 124c. Front and rear support arms 130a, 130b are rotatably connected to the support bracket 126 via pins 132a, 132b. A rigid frame 134, which may be configured as necessary for connection to the vehicle underbody 12, provides a secure mounting for the support arms 130a, 130b which are rotatably mounted to the frame 134 via pins 136a, 136b. It will be appreciated, however, that any suitable structure or technique (other than the frame 134) may be employed to rotatably connect the arms 130a, 130b to the vehicle.

As with the embodiment shown in FIGS. 1-2, the retractable vehicle step 120 depicted in FIGS. 3-5 defines the following axes of rotation, best seen in FIG. 4: a first axis A-A about which the front support arm 130a rotates with respect to the underbody 12 and/or frame 134; a second axis B-B about which the rear support arm 130b rotates with respect to the underbody 12 and/or frame 134; a third axis C-C about which the front support arm 130a and support bracket 126 rotate with respect to each other; and a fourth axis D-D about which the rear support arm 130b and support bracket 126 rotate with respect to each other. FIG. 3, as a side elevation view of FIG. 4, depicts the axes A-A, B-B, C-C, D-D as points. The first axis A-A is spaced from the third axis C-C by a first distance X and the second axis B-B is spaced from the fourth axis D-D by a second distance Y. (In other words, the first axis A-A is spaced from the rotatable connection of the front support arm 130a to the step member 122 by the first distance X, and the second axis B-B is spaced from the rotatable connection of the rear support arm 130b to the step member 22 by the second distance Y.) In one embodiment, the first and second distances X, Y are unequal; in another embodiment the first distance X is greater than the second distance Y. In one embodiment, the first axis A-A is located upward from the second axis B-B.

The first axis of rotation A-A is oriented generally parallel to the ground and/or the lower edge 19 (see FIG. 5), and the second axis of rotation B-B is also oriented generally parallel to the ground and/or the lower edge 19. The third and fourth axes C-C, D-D are oriented generally parallel to the first and second axes A-A, B-B.

With further reference to FIG. 3, the first axis A-A is spaced from the second axis B-B by a third distance M and the third axis C-C is spaced from the fourth axis D-D by a fourth distance N. In one embodiment, the third and fourth distances M, N are unequal; in another embodiment the third distance M is greater than the second distance N. In one embodiment, a line connecting the first axis A-A and the third axis C-C is non-parallel to a line connecting the second axis B-B and the fourth axis D-D when the retractable vehicle step 120 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 120 is in the deployed position.

In one embodiment, as seen in FIG. 3, a first aspect ratio may be defined as the ratio between (1) the distance between the first and second axes A-A, B-B and (2) the length of the front arm 130a as defined by the distance between the first and third axes A-A, C-C. In the embodiment shown in FIG. 3, the first aspect ratio is about 0.75. Likewise, a second aspect ratio may be defined as the ratio between (1) the distance between the first and second axes A-A, B-B and (2) the length of the rear arm 130b as defined by the distance between the second and fourth axes B-B, D-D. In the embodiment shown in FIG. 3, the second aspect ratio is about 0.93. A third aspect ratio may be defined as the ratio between (1) the distance between the first and second axes A-A, B-B and (2) the distance between the third and fourth axes C-C, D-D. In the embodiment shown in FIG. 3, the third aspect ratio is about 1.35.

With reference to FIG. 4, each of the support arms 130 comprises a generally planar, unitary member which forms two coaxial bearing members 131 at either end thereof. The coaxial bearing members may comprise coaxial bores which engage pins in the frame and step member to rotatably connect the support arm to each. In other embodiments the coaxial bearing members may comprise coaxial axle portions which engage bores formed in the frame/step member to provide the rotatable connections. Alternatively, one or both of the support arms may form a single bearing member at one or both ends, comprising a single full-width bore or a single, central partial-width bore.

The spacing of the coaxial bearing members 131 defines a connection width CW at each end of each support arm. The connection width represents the distance between the opposite ends of the engagement of the bearing members with the frame/stepping member. For example, in FIG. 4 the support arm 130a is rotatably connected to the frame along an upper connection width, which equals the distance between the outer edges of the coaxial bearing members 131. The support arm 130a is connected to the step member along a lower connection width. The support arm 130b likewise defines an upper connection width and a lower connection width. These four connection widths are shown in FIG. 4 as being approximately equal, but they may be varied in relative size as desired.

The support arms 130a, 130b also include a rigid crosspiece 133 interconnecting the bearing members 131. The crosspiece is advantageously of sufficient strength to prevent the support arms 130a, 130b from substantially deflecting from their planar configuration when a user steps on the stepping deck 124. The crosspiece may take on any suitable configuration, such as the full-size member shown, or a series of individual cross members extending horizontally or diagonally in an "X" pattern, etc. The high rigidity of the crosspiece and the arms 130a, 130b as a whole advantageously permits the width of the arms to be minimized while nonetheless providing stable support for the stepping deck 124 when in the extended position.

The front and rear support arms may take on other forms and configurations, but desirably each comprises a generally planar linkage connecting the step member to the frame. A "generally planar linkage" may advantageously comprise a generally planar, unitary member such as support arm 130a or support arm 130b as shown in FIG. 4. An alternative "generally planar linkage" comprises two or more separate arms (employed in place of a single unitary arm) interconnecting the frame and step member, the arms being coplanar by virtue of a common upper axis of rotation associated with rotatable connection of the arms to the frame, and a common lower axis of rotation associated with rotatable connection of the arms to the step member opposite the frame. As with a unitary arm, a multiple-arm planar linkage defines at either end thereof a connection width extending between the outer edges of the coaxial bearing members formed by the outermost arms making up the linkage.

With further reference to FIGS. 3 and 4, the support bracket 126 may comprise any suitable structural member having sufficient rigidity to resist bending about its horizontal and longitudinal axes. Thus the box configuration shown in FIG. 4 is particularly suitable, but those skilled in the art will appreciate that the bracket 126 can take on other shapes known to those skilled in the art. The relatively small connection width of the arms 130 permits the bracket 126 to be made of minimal width as well. By making the bracket 126 of sufficient length, the stepping deck 124 will be positioned properly for easy use when the step 120 is in the deployed position (see FIG. 3) and the length of the arms 130 can be kept to a minimum.

As best seen in FIG. 3, the support bracket 126 preferably forms an angle with the stepping deck 124, and thus extends upward and rearward from the substantially level (when in the extended position) upper surface of the deck 124. Consequently, the preferred angled configuration further enables the length of the support arms 130 to be minimized. The step member 122 may thus be said to move between an upward-rotated orientation in the retracted position (FIG. 5) to a downward-rotated orientation in the deployed position (FIG. 3). In other words, the step member 122 rotates downward about its connection with the support arm 130b when moving to the deployed position, and rotates upward about the same connection when moving to the retracted position. When in the retracted position the stepping deck 124 tilts upward (with the outboard end 124a located upward from the inboard end 124b), minimizing the total downward protrusion of the retractable step from the vehicle underbody. Desirably, this upward tilt is at least 10° and, preferably at least 20°, to facilitate any water or debris draining off the step and thereby enhance its safety when in use.

With the stepping member 122 moveably connected to the frame 134 via the support arms 130a, 130b, it can be moved between the retracted position A and the extended position B, as shown in FIGS. 5 and 3, respectively. As with the embodiment described previously, the retractable step 120 provides a sturdy step for a vehicle user when in the extended position B. The geometry of the stepping member 122, support arms 130, and frame 134 causes the arm 130a to be loaded in tension and the arm 130b to be loaded in compression when a load is applied to the stepping deck 124 in a manner similar to that shown in FIG. 1. Accordingly, the arm 130b urges the arm 130a against a stop 152 when a user steps on the stepping deck 124, by applying a horizontal reaction force to the step member 122. The stop 152 prevents motion of the drive arm 138 beyond a location chosen so that when the drive arm 138 strikes the stop 152, the step 120 is in a configuration where it tends to move further away from the retracted position upon application of a load to the stepping deck 124, but is prevented from doing so by virtue of the stop. Due to this convergence of factors, the extended step 120 firmly maintains its deployed position without input from motor 146 (discussed in further detail below), when stepped upon by a user. This feature eliminates the need for a separate locking mechanism, often seen in the form of a hydraulic lock, to maintain the stepping deck in the deployed position when in use. Consequently, this feature enhances the ease of use of the retractable step, as the user is not required to operate or disengage the lock when retracting or deploying the step, thereby eliminating an undesirable aspect of prior-art retractable step systems.

A drive system 137 provides powered movement of the step 120 between the retracted and the extended position. The drive system 137 comprises a drive arm 138 coupled to a rotor 139, both of which are rotatably mounted on the pin 136a, and a motor 146 drivingly connected to the drive arm 138 via the rotor 139. The drive arm 138 is connected to the rotor 139 so as to rotate in concert therewith about the pin 136a. In another embodiment, the rotor and drive arm form an integral unit.

The motor 146 can be mounted to the frame 134, to the vehicle underbody, or in any other suitable location. The motor 146 drives the rotor, drive arm, stepping member, etc. via, for example, a worm gear 147 that meshes with teeth (not shown) formed on the circumference of the rotor 139. In another embodiment, the motor may comprise a linear actuator that pushes or pulls on the circumference of the rotor 139 in order to rotate it in either direction. Of course, any suitable means of coupling the motor to the rotor/drive arm may be used. Advantageously, a window motor may be used to drive the apparatus. Preferably, the motor will adjust for changes in temperature.

The drive system 137, or any drive system employed with any of the embodiments of the retractable step disclosed herein, may advantageously include a system to stop the motion of the step member, arms, etc. when an obstruction is encountered within the range of motion of the step, or within the moving parts of the step. Such a system reduces the risk of a pinching injury when a person has inadvertently inserted his or her hand, arm, etc. within the mechanism, and also reduces the potential for damaging the step member or other parts of the retractable step when it approaches or strikes a hard object such as a curb. It is contemplated that a standard anti-pinch/anti-strike system may be used, as is known in the art.

Advantageously, one or both of the arms 130a, 130b are connected to the step member 122 within a connection region 131 (see FIG. 3) which is located rearward and upward from the stepping deck 124. This configuration minimizes the length and the downward and forward travel of the arms 130*a*, 130*b* while facilitating a long overall "reach" for the step 120, with convenient placement of the stepping deck 124 when the step is in the extended position. Furthermore, this arrangement permits the use, where desired, of an angled step member 122 which can be retracted against the underbody 12 with minimal loss of ground clearance.

In one embodiment, when the step 120 is viewed from the side, in a plane perpendicular to the first axis (see FIG. 3) the third and fourth axes comprise points in the connection region 131, and a line extending through the points forms an included angle β of about 10 degrees with respect to the upper surface of the stepping deck 124. In another embodiment, the angle β may be between 5 and 20 degrees. In still other embodiments, the fourth axis may be located anywhere within the connection region 131 rearward and upward of the third axis and the angle β may thus be any angle greater than 0 degrees and less than 90 degrees.

A dust cover or cap 154 may be mounted to the lower body panel 18 to provide a storage location for the stepping member 122 and prevent dust or grime from collecting on the stepping deck 124. The dust cover 154 advantageously has a portion that protrudes downward from the lower surface of the vehicle and extends across the gap formed between the upper surface of the deck 124 and the adjacent vehicle structure, and may extend or curl around the outer edge of the deck 124. Thus the dust cover 154 forms a protective pocket around the outer edge and upper surface of the deck 124. It has been found that the dust cover 154 reduces the accumulation of water, dust, mud and/or debris on the deck, providing a substantial benefit in terms of safety and aesthetics while reducing the chance of soiling the user's clothes when he or she steps on or stands near the deck.

The retractable step thus utilizes a relatively compact linkage system to support the stepping deck 124 when in the deployed position. The relatively short, compact support arms 130 can be made of minimal width, as can the frame 134 and support bracket 126. The stepping deck 124 can thus be made substantially wider than the frame/support arms/support bracket. In other words the stepping deck 124 is preferably substantially wider than any of the connection width(s) defined by the support arms. Advantageously, the stepping deck is about 2-8 times as wide as the frame, support arms, support bracket or any of the connection width(s) defined by the support arms. Thus the retractable step provides a wide stepping deck for the vehicle user while minimizing the width and space requirements of the frame, linkage system, etc.

Figure 6A:
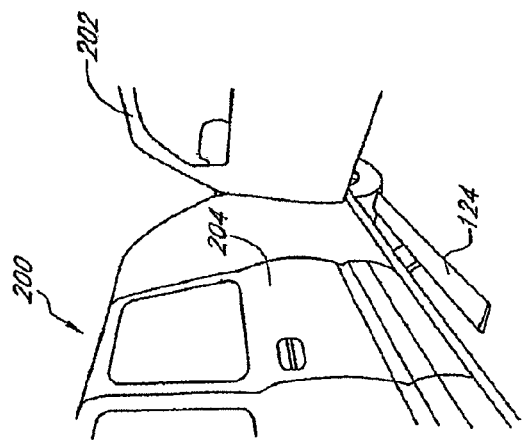
FIGS. 6A-6B are perspective views of the retractable vehicle step as used in connection with a vehicle.
Figure 6B:
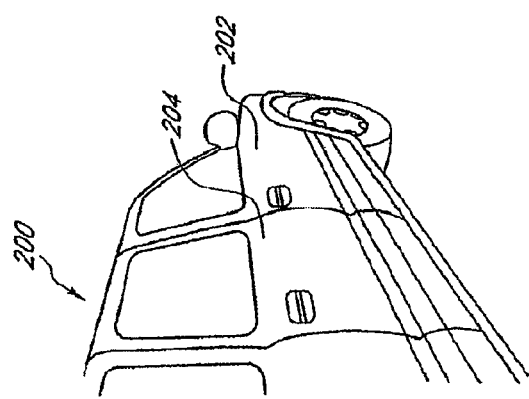

The wide stepping deck 124 and relatively narrow frame/support arms/support bracket permit a single retractable step to serve as a convenient step assist for two adjacent doors of a vehicle, without occupying a large amount of space under the vehicle with the frame, support arms and support bracket. FIG. 6A shows a vehicle 200 having on one side thereof a front door 202 and an adjacent rear door 204. In FIG. 6A no portion of the retractable vehicle step is visible because it is in the retracted position. FIG. 6B shows the stepping deck 124 of the retractable step after it has moved to the extended position (upon opening the front door 202 or in response to other actions as detailed above). It is readily seen that the deck 124 provides a convenient step assist for a person desiring to enter the vehicle through either of the doors 202, 204. Where the deck 124 extends in front of about ¼ of the width of each door, the deck will be sufficiently wider than the user's foot to provide an easy-to-use step. Extending the deck to cover about ½ the width of each door provides an additional safety factor above a ¼-width deck. A deck which extends across substantially the entire width of both doors is most advantageous in that it essentially eliminates the need for the user to look down to the step when placing a foot upon it, facilitating easy use by a person carrying a large number of items with them.

More broadly stated, the novel configuration of the retractable step permits the width of the stepping deck to be selected largely independently of the width of the frame, arms and/or support bracket. Consequently, a stepping deck that is intended to serve as a step for two adjacent doors need not extend the entire width of the doors. It may instead be only about 4-5 feet wide (in comparison to a standard fixed running board which is typically 6-8 feet in width), providing a convenient step while keeping the size and weight of the overall device to a minimum. It has been found that this particular width provides an optimal balance between providing ease of use (via a relatively wide deck) and avoiding an overly large, bulky device. Likewise, the stepping deck of a retractable step intended for use with a single vehicle door may be reduced to an optimal deck width which is less than the entire width of the door.

FIGS. 7-11 depict another embodiment 220 of the retractable vehicle step, attached to a vehicle underbody 12 having a doorjamb 50 adapted to receive a vehicle door (not shown), an under panel 18, and a substantially vertical outer panel or surface 52. The retractable step 220 comprises a stepping member 222 that includes a stepping deck 224 bolted or otherwise rigidly connected to a support bracket 226. Front and rear support arms 230*a*, 230*b* are rotatably connected to the support bracket 226 via pins 232*a*, 232*b*. The rear support arm includes a retraction stop 231*a* and a deployment stop 231*b*. A rigid frame 234, which may be configured as necessary for connection to the vehicle underbody 12, provides a secure mounting for the support arms 230*a*, 230*b* which are rotatably mounted to the frame 234 via pins 236*a*, 236*b*. The frame 234 may include a forward extension 235 which forms a rail 235*a* for attachment of the frame 234 to the vehicle underbody 12, via bolting, riveting, welding or other conventional methods. It will be appreciated, however, that a wide variety of structure may be used in place of or in addition to the extension 235 and rail 235*a* to facilitate attachment of the frame 234 to different vehicle makes and models. Likewise, it will be appreciated that any suitable structure or technique (other than the frame 234) may be employed to rotatably connect the arms 230*a*, 230*b* to the vehicle.

The front support arm 230*a* is rotatable about a first axis of rotation A-A which is oriented generally parallel to the lowest edge or extension 300 of the vehicle underbody 12, and the rear support arm 230*b* is rotatable about a second axis of rotation (not shown) which is also oriented generally parallel to the lowest edge 300. The front arm 230*a* and the support bracket 226 are rotatable with respect to each other about a third axis of rotation C-C, and the rear arm 230*b* and the bracket 226 are rotatable with respect to each other about a fourth axis of rotation D-D. The third and fourth axes C-C, D-D are oriented generally parallel to the first and second axes.

Figure 7:
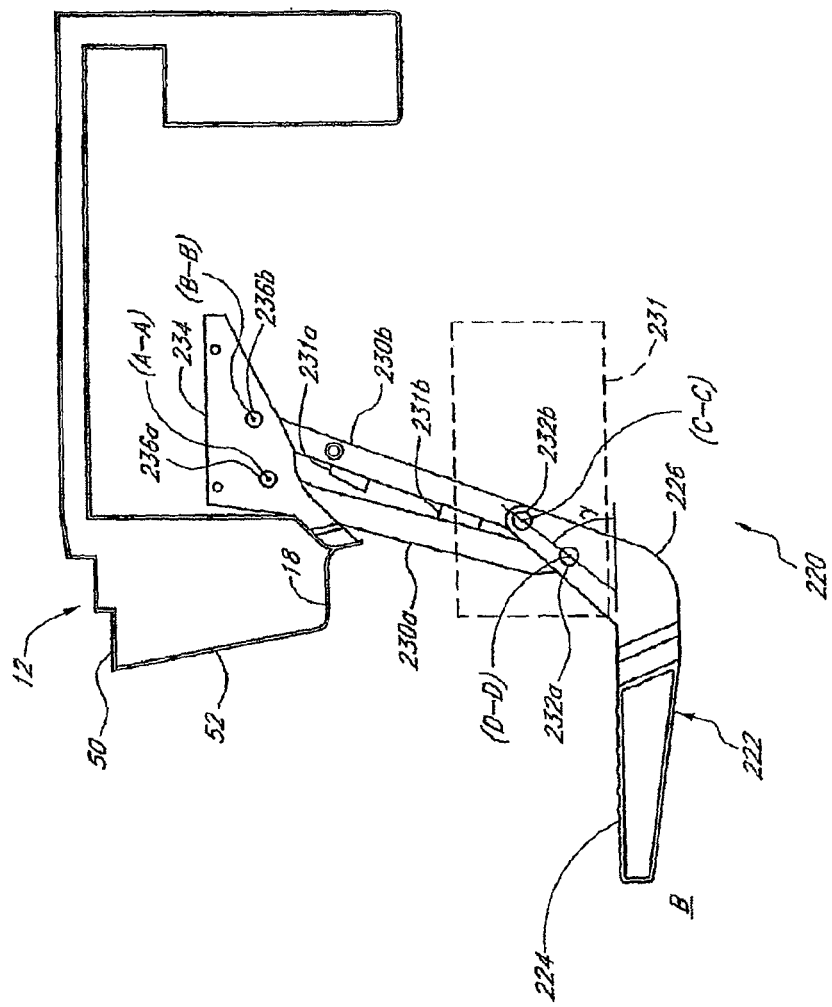
FIG. 7 is a side view of a further embodiment of a retractable vehicle step, in the extended or deployed position.
Figure 8:
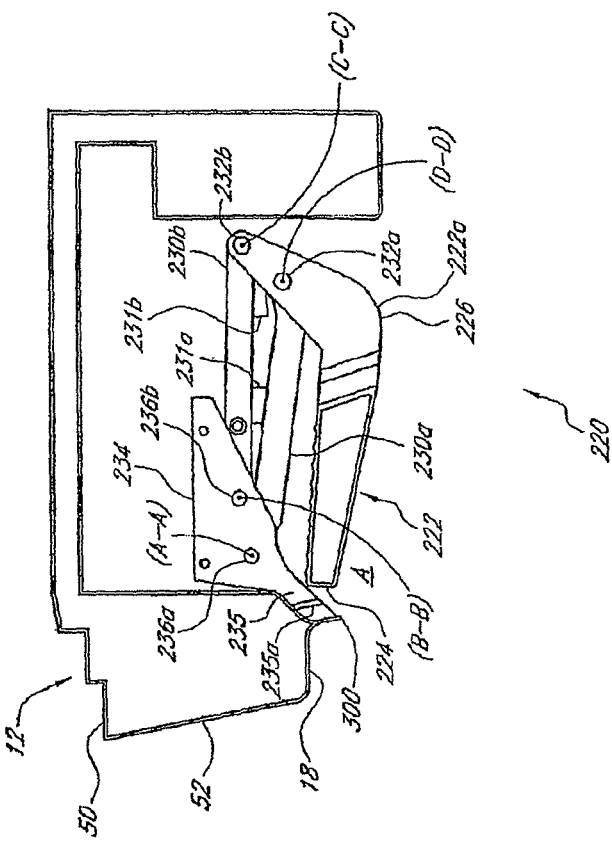
FIG. 8 is a side view of the embodiment of FIG. 7, in the retracted position.
Figure 9:
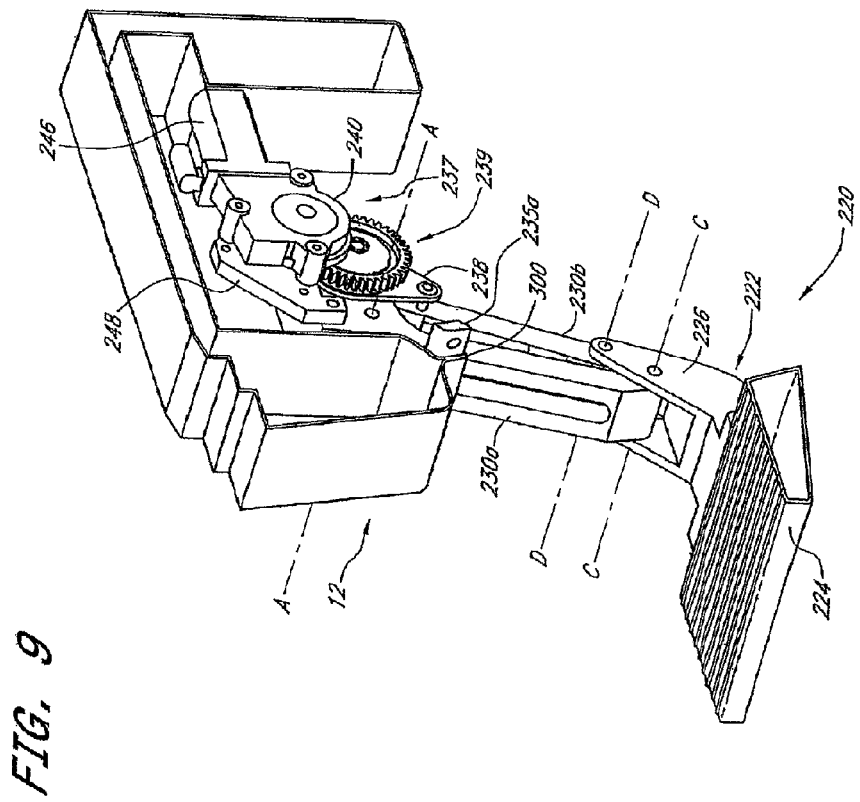
FIG. 9 is a perspective view of the embodiment of FIG. 7.

For the sake of clarity, the distances between the various axes A-A through D-D are not marked on FIGS. 7 and 8; however, the following discussion of the geometry of the layout of the axes applies with equal force to the embodiment of FIGS. 7-9, as it did with regard to the embodiments discussed above. With reference to FIG. 7, the first axis A-A is spaced from the third axis C-C by a first distance and the second axis B-B is spaced from the fourth axis D-D by a second distance. In one embodiment, the first and second distances are unequal; in another embodiment the first distance is greater than the second distance. In one embodiment, the first axis A-A is located upward from the second axis B-B.

The first axis A-A is spaced from the second axis B-B by a third distance and the third axis C-C is spaced from the fourth axis D-D by a fourth distance. In one embodiment, the third and fourth distances are unequal; in another embodiment the third distance is greater than the second distance. In one embodiment, a line connecting the first axis A-A and the third axis C-C is non-parallel to a line connecting the second axis B-B and the fourth axis D-D when the retractable vehicle step 220 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 220 is in the deployed position.

In one embodiment, as seen in FIG. 7, a first aspect ratio may be defined as the ratio between (1) the distance between the first and second axes and (2) the length of the front arm 230a as defined by the distance between the first and third axes A-A, C-C. In the embodiment shown in FIG. 7, the first aspect ratio is about 0.21. Likewise, a second aspect ratio may be defined as the ratio between (1) the distance between the first and second axes and (2) the length of the rear arm 230b as defined by the distance between the second and fourth axes. In the embodiment shown in FIG. 7, the second aspect ratio is about 0.22. A third aspect ratio may be defined as the ratio between (1) the distance between the first and second axes and (2) the distance between the third and fourth axes C-C, D-D. In the embodiment shown in FIG. 7, the third aspect ratio is about 1.00.

As depicted in FIGS. 7 and 8, the retractable step 220 is moveable between a retracted position A and an extended position B. When the step 220 is in the extended position B, a downward force exerted on the stepping deck 24 causes the deployment stop 231b to bear against the front support arm 230a. At this point the step 220 is in a configuration where it tends to move further away from the retracted position B upon application of a load to the stepping deck 224, but is prevented from doing so by virtue of the deployment stop 231b. Due to this convergence of factors, the extended step 220 firmly maintains its deployed position without input from the motor 246 (discussed in further detail below), when stepped upon by a user. This feature eliminates the need for a separate locking mechanism, often seen in the form of a hydraulic lock, to maintain the stepping deck in the deployed position when in use. Consequently, this feature enhances the ease of use of the retractable step, as the user is not required to operate or disengage the lock when retracting or deploying the step, thereby eliminating an undesirable aspect of prior-art retractable step systems.

Advantageously, one or both of the arms 230a, 230b are connected to the step member 222 within a connection region 231 (see FIG. 7) which is located rearward and upward from the stepping deck 224. This configuration minimizes the length and the downward and forward travel of the arms 230a, 230b while facilitating a long overall "reach" for the step 220, with convenient placement of the stepping deck 224 when the step is in the extended position. Furthermore, this arrangement permits the use, where desired, of an angled step member 222 which can be retracted against the underbody 12 and/or folded against the arms 230a, 230b to compactly package the step 220 when retracted, which in turn facilitates installation of the step 220 within a small space of the underbody 12, and minimal loss of ground clearance.

The retractable step 220 shown in FIGS. 7-9 thus has a wide range of motion, such that the entirety of the stepping deck 224 is located outboard of the first axis A-A when the step member is in the deployed position B and at least a portion of the stepping deck 224 is located inboard of the second axis B-B when the step member is in the retracted position A. In one embodiment, the upper surface of the stepping deck 224 is the uppermost portion of the retractable step 220 outboard of the support bracket 226, when the step member 222 is in the deployed position. In another embodiment, the upper surface of the stepping deck 224 is located about 10-12 inches above the ground when the step member 222 is in the deployed position. In another embodiment, the upper surface of the stepping deck 224 is located about 10 inches above the ground when the step member 222 is in the deployed position. In another embodiment, the upper surface of the stepping deck 224 is located about 11 inches above the ground when the step member 222 is in the deployed position. In another embodiment, the upper surface of the stepping deck 224 is located about 12 inches above the ground when the step member 222 is in the deployed position.

In one embodiment, when the step 220 is viewed from the side, in a plane perpendicular to the first axis (see FIG. 7) the third and fourth axes comprise points in the connection region 231, and a line extending through the points forms an included angle γ of about 50 degrees with respect to the upper surface of the stepping deck 224. In other embodiments, the angle γ may be between 20 and 80 degrees, or between 40 and 60 degrees. In still other embodiments, the fourth axis may be located anywhere within the connection region 231 rearward and upward of the third axis and the angle γ may thus be any angle greater than 0 degrees and less than 90 degrees.

In the embodiment shown in FIGS. 7 and 8, the upper surface of the stepping deck 224 may define a substantially horizontal plane in both the extended and retracted positions.

FIGS. 7, 8 and 9 show that the front support arm 230a preferably has a bowed configuration, with a relatively straight midsection between two angled end portions. This preferred geometry ensures that the retraction and deployment stops 231a, 231b will contact the front support arm 230a at a location which is spaced from its rotatable connections to the pins 232a, 236a. It has been found that shear loading of the arm 230a near these connection points, such as that which may occur in the deployed position absent the stop 231b, can lead to failure in some circumstances.

In the embodiment presently under discussion, when the retractable step 220 is in the retracted position, it is concealed, preferably completely concealed, from the view of a typical standing adult curbside observer of the vehicle. In this position the stepping member 222, as well as the frame 234 and the remainder of the retractable step 220, is disposed behind the lowest extension or lower edge 300 of the vehicle underbody 12. Preferably, the forward edge of the stepping deck 224 is spaced at least about 1.5-4.5 inches rearward of the lower portion of the outer panel 52; more preferably, the forward edge is spaced at least about 2.5-3.5 inches rearward of the lower portion of the panel 52; most preferably, the forward edge is spaced at least about 3.2 inches rearward of the lower portion of the panel 52. Furthermore, the lowest-extending point 222a of the stepping member 222 is situated above the lowest extension 300 of the underbody 12, or protrudes such an amount below the extension 300 (and/or is disposed sufficiently rearward of the extension 300) that it substantially remains, and preferably completely remains, out of the field of view of a typical standing adult observer positioned outside of the vehicle. In one embodiment, the retracted step 220 is not visible to an adult standing 5 feet from the vehicle; in another embodiment, the retracted step 220 is not visible to an adult standing 10 feet from the vehicle;

in another embodiment, the retracted step 220 is not visible to an adult standing 20 feet from the vehicle.

This concealment is achieved primarily by providing a wide range of motion of the stepping member 222. The front and rear support arms 230a, 230b are made sufficiently long, and/or provided with a sufficiently wide range of angular motion, to move the stepping member 222 rearward and upward into the concealed, retracted position A. The arms 230a, 230b are also made sufficiently long in comparison to the stepping member 222, and are mounted to the frame 234 on pivot points spaced sufficiently rearward of the extension 300, to move the front edge of the stepping deck 234 behind the extension 300 during retraction. The connection points of the arms 230a, 230b to the frame 234 and stepping member 222 are selected to prevent either arm from interfering with the other's motion over a wide range of travel. The frame 234 includes adequate clearance to accommodate the motion of the stepping member 222 and arms 230a, 230b to and from the retracted position A. Thus, when the member 222 is retracted, substantially no portion of the step 200 is visible to an ordinary "curbside" observer, and a vehicle with the step 220 installed and retracted will appear substantially identical to such an observer, to a "stock" version of the same vehicle.

FIG. 9 depicts a preferred drive system 237 for providing powered movement of the step 220 between the retracted and the extended position. The drive system 237 preferably comprises a drive arm 238 which is drivingly coupled to the rear support arm 230b, and is further coupled to a clutch assembly or torque limiter 239. The clutch assembly 239 is in meshing engagement with a primary gear system 240 and a motor 246. Alternatively, the motor 246 may drive the clutch assembly 239 directly, and the primary gear system 240 may be omitted. A subframe 248 may be provided for mounting the primary gear system 240 and/or motor 246 with respect to the frame 234. The clutch assembly 239 and drive arm 238 are preferably rotatably mounted to the frame 234 so that a driving force on the teeth of the clutch assembly 239 causes the assembly 239 and the drive arm 238 to rotate together and move the step 220 to or from the retracted position.

FIGS. 10 and 11 show a preferred configuration of the clutch assembly 239 and drive arm 238 in greater detail. The clutch assembly 239 includes a broached or splined hub 250 which is configured for rotatable attachment to the frame 234. The drive arm 238 includes a broached opening 252 to provide a positive connection to the hub 250 when mounted thereon. Adjacent the drive arm 238 is a first clutch member 254 formed from a high-friction clutch material as is known in the art, an input gear 256 having conventional gear teeth for receiving a driving force applied by the primary gear system 240 and/or motor 246, and a second clutch member 258, which is preferably similar to the first clutch member 254. A broached washer 260 covers the clutch member 258, and a bevel spring 262 and nut 264 (threadably engaged with the hub) secure the entire assembly to the hub 250. Thus, under pressure exerted by the spring and nut, the input gear 256 is frictionally coupled to the drive arm 238, hub 250 and washer 260 via the clutch members 254, 258.

In normal operation, the input gear 256 and the drive arm 238 will rotate together about their common axis of rotation, acting as if a single component, to drive the step 220 between the retracted and extended positions under the power of the motor 246. However, under appropriate circumstances the clutch members 254, 258 will permit slippage to occur between the input gear 256 and the drive arm 238, such that relative angular motion occurs between the gear 256 and the arm 238. One circumstance under which this may occur is when the motor 246 is cut off from its power supply while the step is at or near the extended position, and the vehicle user must manually push the step into the extended position. The clutch permits the step to be manually retracted in this manner without back-loading the motor 246, protecting the motor from damage.

The clutch assembly 239 is also useful in a situation in which the step 220 is being moved under power of the motor, but strikes an obstruction which prevents further motion of the step. In this situation, the clutch prevents damage to the motor (and possible injury where the step has struck a person's hand, leg, etc.) by allowing it to continue turning under the power supplied to it while the step is immobilized, avoiding burn-out of the motor 246. This provides a further safety measure which can be used, if desired, in conjunction with a standard anti-pinch/anti-strike system as discussed above.

FIGS. 12 and 13 depict a further embodiment 420 of the retractable vehicle step, in which two or more retraction assemblies 450 are connected to, and provide retraction and deployment of, a single stepping deck 424. Each of the retraction assemblies 450 may comprise structure which generally similar to any of the embodiments disclosed herein for the retractable vehicle step; however, the embodiment shown in FIGS. 12 and 13 utilizes the mechanism disclosed above in connection with FIGS. 3-5. One or both of the assemblies 450 may include a motor for moving the step between the deployed position (FIG. 12) and the retracted position (FIG. 13).

The assemblies 450 are preferably coupled to the stepping deck 424 at locations spaced inward from the outer edges of the deck 424. This configuration limits the maximum moment arm defined between a load placed on the deck 424 and either of the connection points to the assemblies 450, and reduces the lateral "footprint" occupied by the step 420 when connecting the step to a vehicle.

Figure 14:
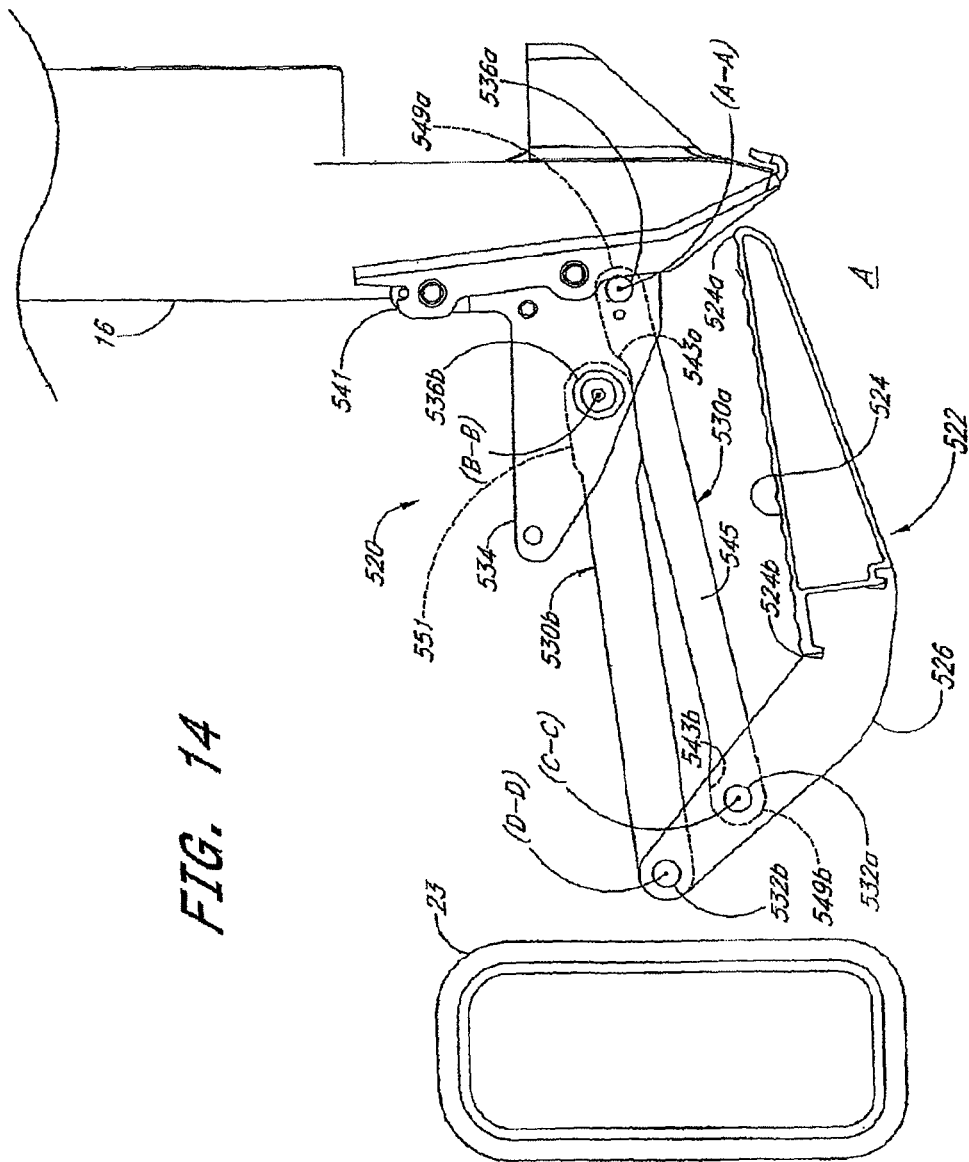
FIG. 14 is a side view of a further embodiment of a retractable vehicle step, in the retracted position.
Figure 15:
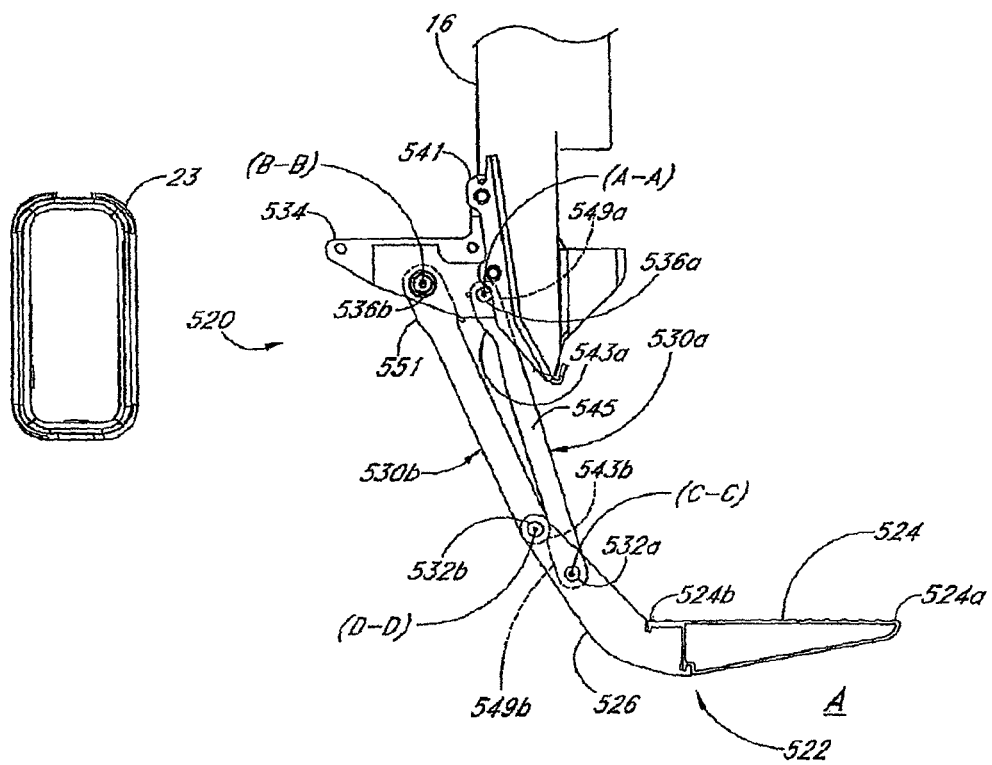
FIG. 15 is a side view of the embodiment of FIG. 14, in the deployed position.

FIGS. 14-15 depict another embodiment of the retractable vehicle step 520, which may be similar to the embodiments discussed above (especially the embodiment depicted in FIGS. 7-9) except as disclosed below. The retractable step 520, shown as attached to the vertical underbody portion 16, comprises a stepping member 522 that includes a stepping deck 524 bolted or otherwise rigidly connected to a support bracket 526. Front and rear support arms 530a, 530b are rotatably connected to the support bracket 526 via pins 532a, 532b. A rigid frame 534 and connection bracket 541, each of which may be configured as necessary for connection to the vertical underbody portion 16, provide a secure mounting for the support arms 530a, 530b which are rotatably mounted to the frame 534 via pins 536a, 536b. The pin 536b may also serve as a drive axle for the rear support arm 530b, by virtue of further connection to a suitable drive system (not shown). Accordingly, the pin 536b may have a larger diameter than the other pins 532a, 532b, 536a. In other embodiments, the pin 536a may be employed as a drive axle, and a larger diameter may be selected for the pin 536.

The connection bracket 541 may be fixed to the vertical underbody portion 16 (and the frame 534 fixed to the connection bracket 541) via bolting, riveting, welding or other conventional methods. It will be appreciated, however, that a wide variety of structure may be used in place of or in addition to the connection bracket 541 to facilitate attachment of the frame 534 to different vehicle makes and models. Likewise, it will be appreciated that, while the frame shown is preferred, any suitable structure or technique (other than the frame 534) may be employed to rotatably connect the arms 530a, 530b to the vehicle.

As with the embodiments discussed above, the retractable vehicle step 520 shown in FIGS. 14-15 defines a set of first through fourth axes A-A through D-D corresponding to the previously-discussed sets of axes. For the sake of clarity, the distances between the various axes A-A through D-D are not marked on FIGS. 14-15; however, the following discussion of the geometry of the layout of the axes applies with equal force to the embodiment of FIGS. 14-15, as it did with regard to the embodiments discussed above. With reference to FIG. 14, the first axis A-A is spaced from the third axis C-C by a first distance and the second axis B-B is spaced from the fourth axis D-D by a second distance. In one embodiment, the first and second distances are unequal; in another embodiment the first distance is greater than the second distance. In one embodiment, the first axis A-A is located upward from the second axis B-B.

The first axis A-A is spaced from the second axis B-B by a third distance and the third axis C-C is spaced from the fourth axis D-D by a fourth distance. In one embodiment, the third and fourth distances are unequal; in another embodiment the third distance is greater than the second distance. In one embodiment, a line connecting the first axis A-A and the third axis C-C is non-parallel to a line connecting the second axis B-B and the fourth axis D-D when the retractable vehicle step 520 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 520 is in the deployed position.

The rearward surface of the front support arm 530a tapers forward at upper and lower transitions 543a, 543b, thus forming a thinner intermediate portion 545 between thicker end portions 549a, 549b. This arrangement permits the arms 530a, 530b to nest partly "within" each other at the extremes of their range of motion, which in turn increases the range of motion of the step member 522 while permitting the ends of the arm(s) to be made thicker, to better withstand the forces encountered at their rotatable connections to the frame and step member. With a greater range of motion thus imparted to the arms 530a, 530b and step member 522, the member 522 can extend farther from the vehicle when deployed and retract further into the vehicle for improved concealment.

As seen in FIG. 14, the rear support arm 530b has a thicker upper portion 551 which approaches or contacts the intermediate portion 545 of the front support arm 530a, near the transition 543a, when the retractable vehicle step 520 is in the retracted position A. Accordingly, the front support arm 530a is shown rotated rearward beyond the point at which the arm 530a would stop (by virtue of contact with the rear support arm 530b) if the arm 530a had a uniform thickness. Generally, increased rearward range of motion can be realized by causing the front arm 530a to rotate to any point at which a portion of the rear arm 530b is spaced from a line connecting the first and third axes A-A, C-C, by an orthogonal distance less than half the maximum thickness of the front arm 530a. The maximum increase in range of motion is achieved by causing the front arm 530a to rotate to a point at which the thinner intermediate portion 545 contacts the rear arm 530b.

FIG. 15 shows the nesting relationship of the arms 530a, 530b when the retractable vehicle step 520 is in the extended position B. A thinner lower portion 553 of the rear support arm 530b approaches or contacts the intermediate portion 545 of the front support arm 530a, near the transition 543b. Under the principles discussed above a wider forward range of motion is facilitated by the thinner intermediate portion 545, than would be possible were the front arm 530a of a uniform thickness.

The retractable step 520 shown in FIGS. 14-15 thus has a wide range of motion, such that the entirety of the stepping deck 524 is located outboard of the first axis A-A when the step member is in the deployed position B and at least a portion of the stepping deck 524 is located inboard of the second axis B-B when the step member is in the retracted position A.

Figure 16:
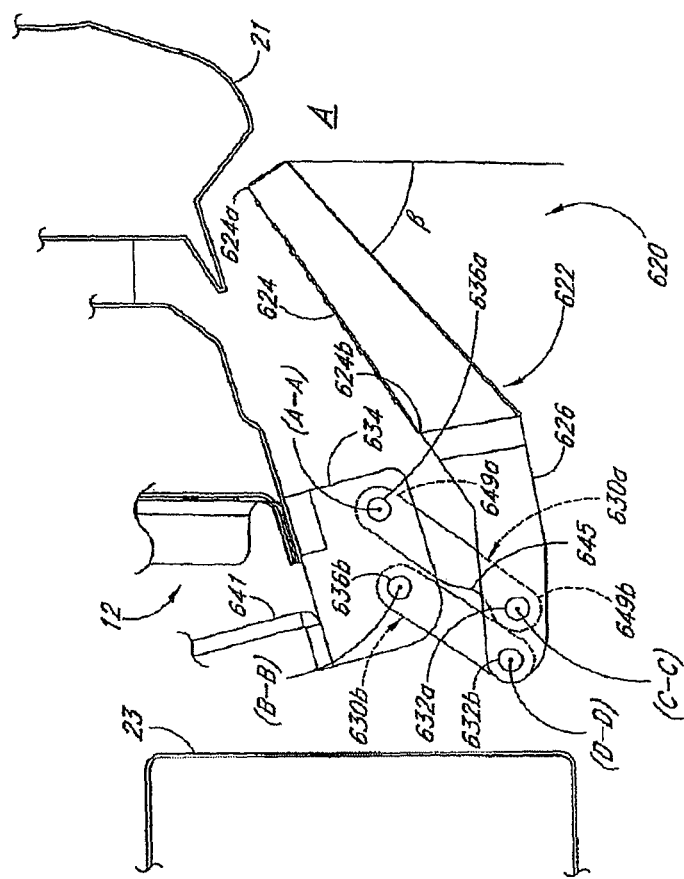
FIG. 16 is a side view of a further embodiment of a retractable vehicle step, in the retracted position.
Figure 17:
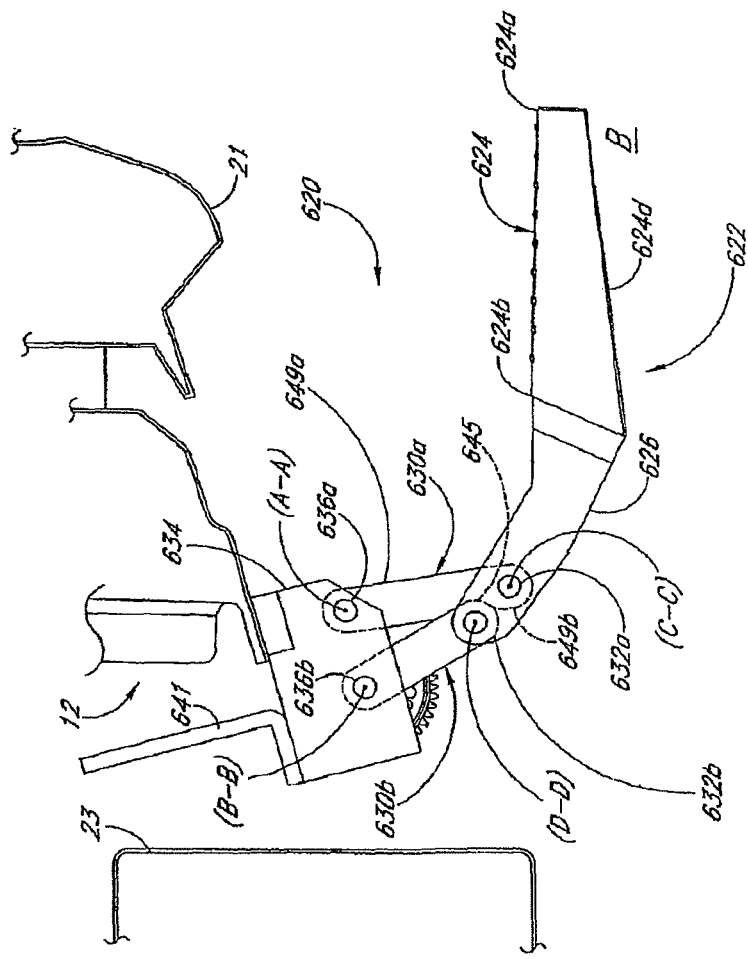
FIG. 17 is a side view of the embodiment of FIG. 16, in the deployed position.

FIGS. 16-17 depict another embodiment of the retractable vehicle step 620, which may be similar to the embodiments discussed above except as disclosed below. The retractable step 620, shown as attached to the underbody 12, comprises a stepping member 622 that includes a stepping deck 624 bolted or otherwise rigidly connected to a support bracket 626. Front and rear support arms 630a, 630b are rotatably connected to the support bracket 626 via pins 632a, 632b. A rigid frame 634 and connection bracket 641, each of which may be configured as necessary for connection to the underbody 12, provide a secure mounting for the support arms 630a, 630b which are rotatably mounted to the frame 634 via pins 636a, 636b.

The frame 634 and connection bracket 641 may be fixed to the vertical underbody portion 16 (and the frame 634 fixed to the connection bracket 5641) via bolting, riveting, welding or other conventional methods. It will be appreciated, however, that a wide variety of structure may be used in place of or in addition to the connection bracket 641 to facilitate attachment of the frame 634 to different vehicle makes and models. While the illustrated design is a preferred embodiment, it will be appreciated that other suitable structures or techniques (aside from the frame 634) may be employed to rotatably connect the arms 630a, 630b to the vehicle.

As with the embodiments discussed above, the retractable vehicle step 620 shown in FIGS. 16-17 defines a set of first through fourth axes A-A through D-D corresponding to the previously-discussed sets of axes. For the sake of clarity, the distances between the various axes A-A through D-D are not marked on FIGS. 16-17; however, the following discussion of the geometry of the layout of the axes applies with equal force to the embodiment of FIGS. 16-17, as it did with regard to the embodiments discussed above. With reference to FIG. 16, the first axis A-A is spaced from the third axis C-C by a first distance and the second axis B-B is spaced from the fourth axis D-D by a second distance. In one embodiment, the first and second distances are unequal; in another embodiment the first distance is greater than the second distance. In one embodiment, the first axis A-A is located upward from the second axis B-B.

The first axis A-A is spaced from the second axis B-B by a third distance and the third axis C-C is spaced from the fourth axis D-D by a fourth distance. In one embodiment, the third and fourth distances are unequal; in another embodiment the third distance is greater than the second distance. In one embodiment, a line connecting the first axis A-A and the third axis C-C is non-parallel to a line connecting the second axis B-B and the fourth axis D-D when the retractable vehicle step 620 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 620 is in the deployed position.

The rearward surface of the front support arm 630a tapers forward to form a thinner intermediate portion 645 between thicker end portions 649a, 649b. This arrangement permits the arms 630a, 630b to nest partly "within" each other when the retractable step 620 is in the deployed position B, which in turn increases the forward range of motion of the step member 622 while permitting the ends of the arm(s) to be made thicker, to better withstand the forces encountered at their rotatable connections to the frame and step member. With a greater forward range of motion thus imparted to the arms 630a, 630b and step member 622, the member 622 can extend farther from the vehicle when deployed.

As seen in FIG. 17, the rounded lower portion of the rear support arm 630b approaches or contacts the thinner intermediate portion 645 of the front support arm 630a when the retractable vehicle step 620 is in the deployed position B. Accordingly, the rear support arm 630b is shown rotated forward beyond the point at which the arm 630b would stop (by virtue of contact with the front support arm 630a) if the front arm 630a had a uniform thickness. Generally, increased forward range of motion can be realized by causing the rear arm 630b to rotate to any point at which a portion of the rear arm 630b is spaced from a line connecting the first and third axes A-A, C-C, by an orthogonal distance less than half the maximum thickness of the front arm 630a. The maximum increase in range of motion is achieved by causing the rear arm 630b to rotate forward to a point at which the thinner intermediate portion 645 contacts the rear arm 630b.

The embodiment shown in FIGS. 16-17 is particularly suited for use in the narrow space depicted, between a lower portion of a vehicle door 21 which is located upward of an adjacent vehicle frame member 23. With little room to retract rearward, the stepping deck 624 instead rotates primarily upward when retracting. Thus, in the depicted embodiment the front edge 624a of the stepping deck 624 is located above the first axis A-A when the step member 622 is in the retracted position A. In addition, the entirety of the stepping deck 624 may be situated forward of the first axis A-A when the step member 622 is in the retracted position A.

When retracted, the retractable vehicle step 620 is substantially concealed from the view of an observer standing next to the vehicle, because the lower surface 624d of the stepping deck 624 extends inward and downward from the lower edge of the door 21 at an angle δ of about 45-65 degrees with respect to vertical. The "upward" position of the retracted deck 624 also blocks the arms, frame, etc. from the view of a typical vehicle-side observer. The concealment may be further enhanced by painting or otherwise coloring the lower surface 624d of the stepping deck with a dark color (black, dark gray, etc.) or coloring it to match the surrounding underbody, frame, etc.

Figure 18:
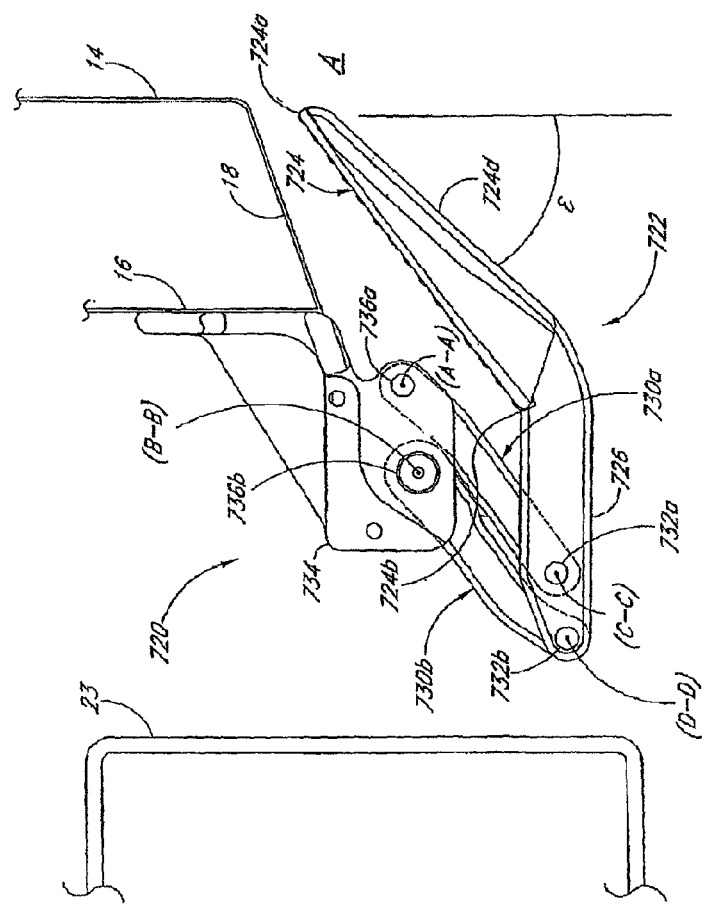
FIG. 18 is a side view of a further embodiment of a retractable vehicle step, in the retracted position.
Figure 19:
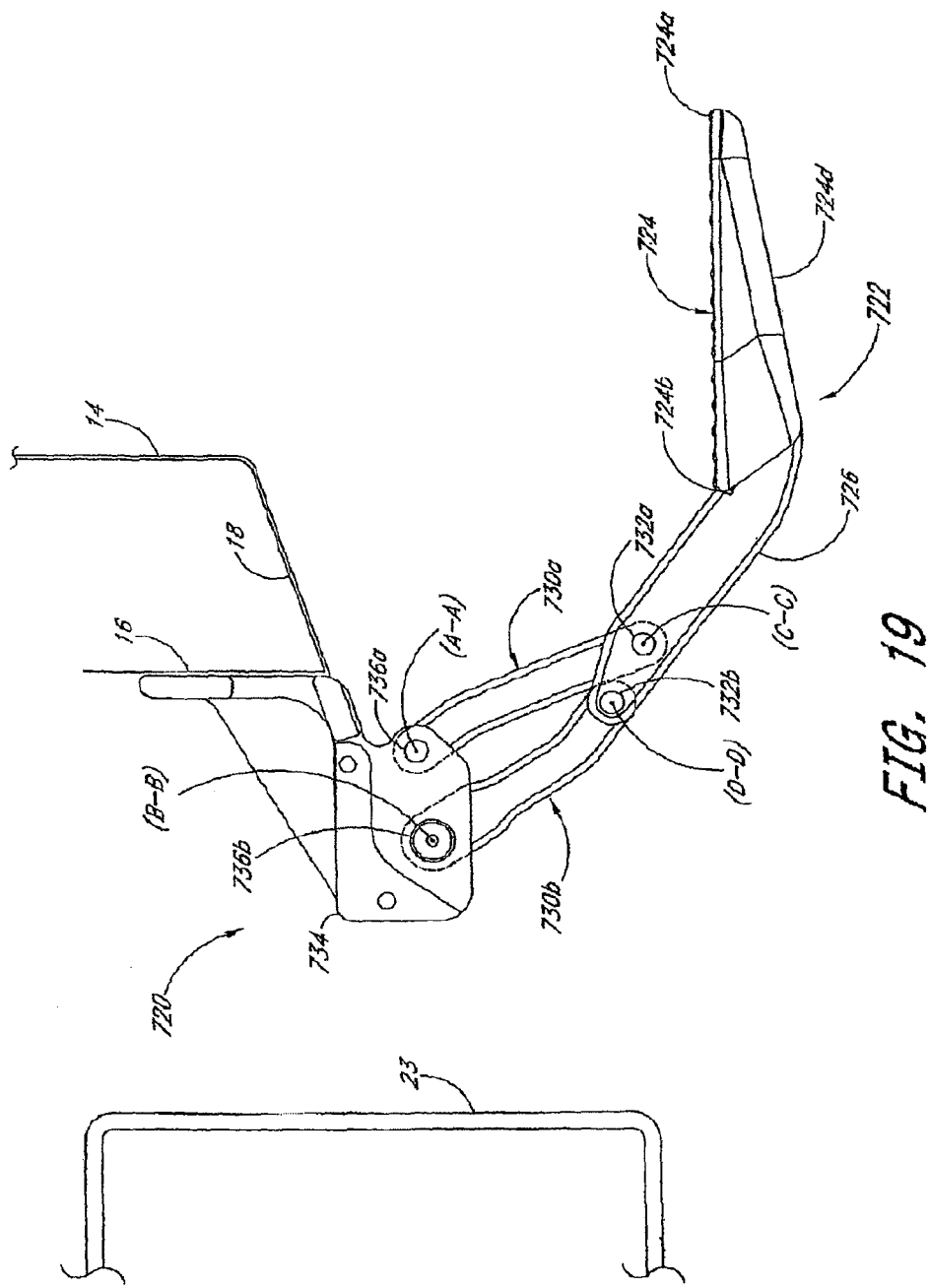
FIG. 19 is a side view of the embodiment of FIG. 18, in the deployed position.

FIGS. 18 and 19 depict another embodiment of the retractable vehicle step 720, which may be similar to the embodiments discussed above except as disclosed below. The retractable step 720 comprises a stepping member 722 that includes a stepping deck 724 bolted or otherwise rigidly connected to a support bracket 726. Front and rear support arms 730a, 730b are rotatably connected to the support bracket 726 via pins 732a, 732b. A rigid frame 734, which may be configured as necessary for connection to the vertical underbody portion 16, provides a secure mounting for the support arms 730a, 730b which are rotatably mounted to the frame 734 via pins 736a, 736b. The pin 736b may also serve as a drive axle for the rear support arm 730b, by virtue of further connection to a suitable drive system (not shown). Accordingly, the pin 736b may have a larger diameter than the other pins 732a, 732b, 736a. In other embodiments, the pin 736a may be employed as a drive axle, and a larger diameter may be selected for the pin 736a.

The frame 734 may be fixed to the vertical underbody portion 16 via bolting, riveting, welding or other conventional methods. It will be appreciated, however, that a wide variety of structure may be used in place of or in addition to the frame 734 to facilitate attachment of the arms 730a, 730b to the vehicle, or different vehicle makes and models.

As with the embodiments discussed above, the retractable vehicle step 720 shown in FIGS. 18-19 defines a set of first through fourth axes A-A through D-D corresponding to the previously-discussed sets of axes. For the sake of clarity, the distances between the various axes A-A through D-D are not marked on FIGS. 18-19; however, the following discussion of the geometry of the layout of the axes applies with equal force to the embodiment of FIGS. 18-19, as it did with regard to the embodiments discussed above. With reference to FIG. 18, the first axis A-A is spaced from the third axis C-C by a first distance and the second axis B-B is spaced from the fourth axis D-D by a second distance. In one embodiment, the first and second distances are unequal; in another embodiment the first distance is greater than the second distance. In one embodiment, the first axis A-A is located upward from the second axis B-B.

The first axis A-A is spaced from the second axis B-B by a third distance and the third axis C-C is spaced from the fourth axis D-D by a fourth distance. In one embodiment, the third and fourth distances are unequal; in another embodiment the third distance is greater than the second distance. In one embodiment, a line connecting the first axis A-A and the third axis C-C is non-parallel to a line connecting the second axis B-B and the fourth axis D-D when the retractable vehicle step 720 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 720 is in the deployed position.

The upper portion of the front arm 730a is bent rearward and the lower portion of the rear arm 730b is bent forward to facilitate a wide range of motion of the arms and step member while permitting the arm(s) to be made relatively thick and strong. With a greater range of motion thus imparted to the arms 730a, 730b and step member 722, the member 722 can extend farther from the vehicle when deployed and retract further into the vehicle for improved concealment. In addition, the bent arm(s) permit the location of the upper and lower axis pairs A-A, B-B and C-C, D-D relatively close to each other without the need to employ arms which are unduly thin and weak.

The embodiment shown in FIGS. 18-19 is also particularly suited for use in the narrow space depicted, between the lower part of the vertical underbody portion 16 which is located upward of an adjacent vehicle frame member 23. With little room to retract rearward, the stepping deck 724 instead rotates primarily upward when retracting. Thus, in the depicted embodiment the front edge 724a of the stepping deck 724 is located above the first axis A-A when the step member 722 is in the retracted position A.

When retracted, the retractable vehicle step 720 is substantially concealed from the view of an observer standing next to the vehicle, because the lower surface 724d of the stepping deck 724 extends inward and downward from the lower edge of the exterior 14 at an angle ε of about 35-55 degrees with respect to vertical. While not as thoroughly concealed as other embodiments, the "upward" position of the retracted deck 724 also blocks a significant portion of the arms, frame, etc. from the view of a typical vehicle-side observer. The concealment may be further enhanced by painting or otherwise coloring the lower surface 724d of the stepping deck with a dark color (black, dark gray, etc.) or coloring it to match the surrounding underbody, frame, etc.

Figure 20:
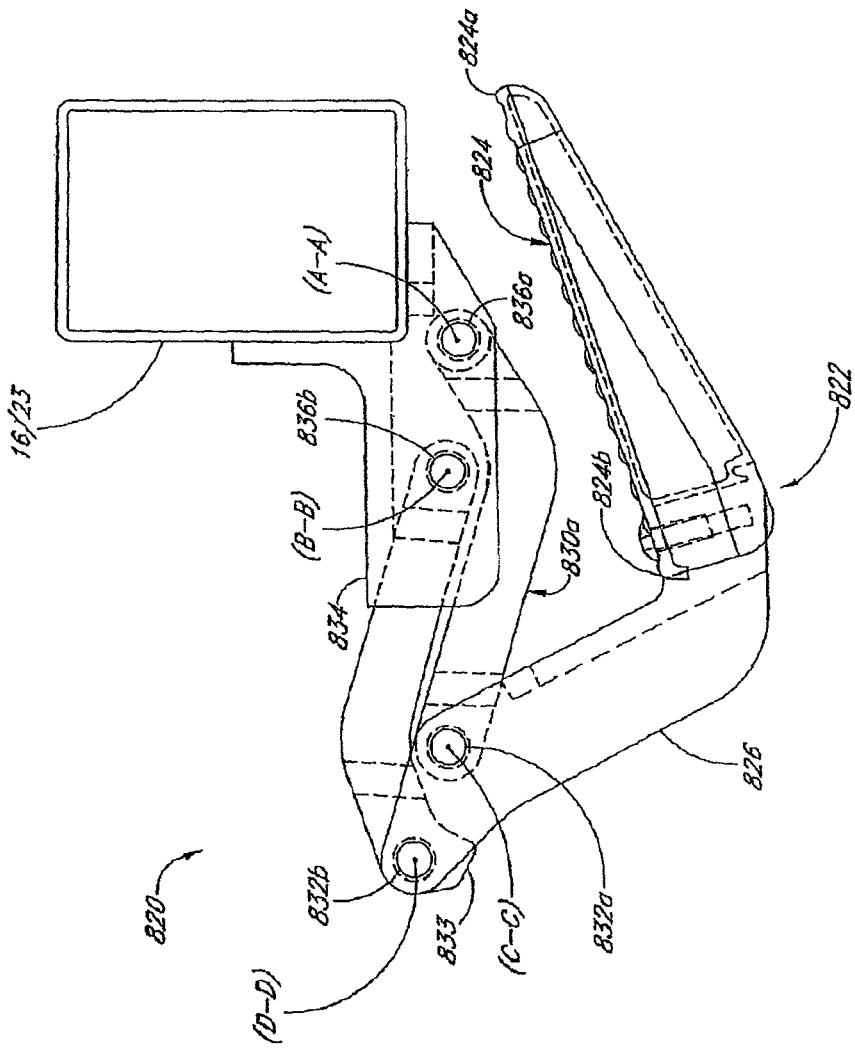
FIG. 20 is a side view of a further embodiment of a retractable vehicle step, in the retracted position.
Figure 21:
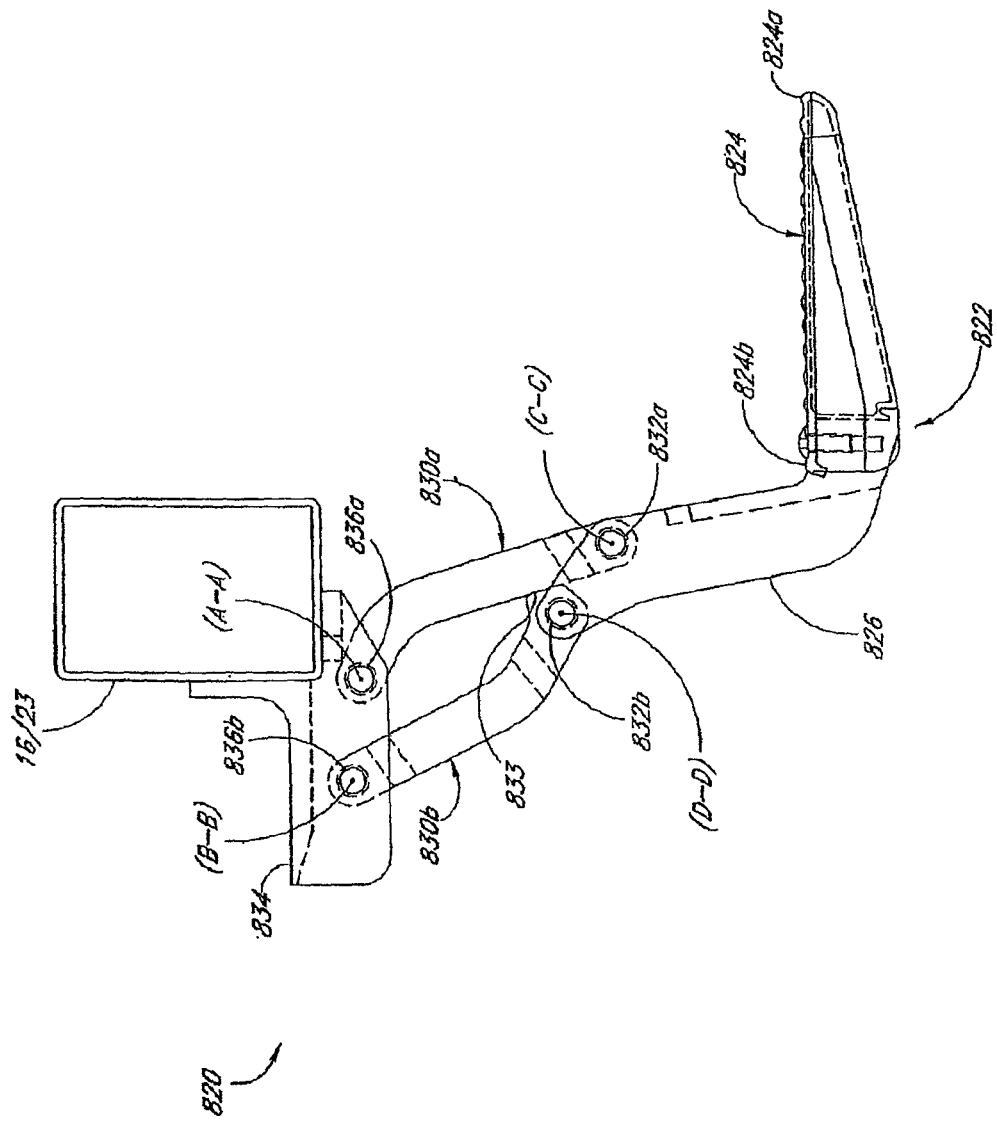
FIG. 21 is a side view of the embodiment of FIG. 20, in the deployed position.

FIGS. 20 and 21 depict another embodiment of the retractable vehicle step 820, which may be similar to the embodiments discussed above except as disclosed below. The retractable step 820 comprises a stepping member 822 that includes a stepping deck 824 bolted or otherwise rigidly connected to a support bracket 826. Front and rear support arms 830a, 830b are rotatably connected to the support bracket 826 via pins 832a, 832b. A rigid frame 834, which may be configured as necessary for connection to the vertical underbody portion 16 (or frame member 23), provides a secure mounting for the support arms 830a, 830b which are rotatably mounted to the frame 834 via pins 836a, 836b.

The frame 834 may be fixed to the vertical underbody portion 16 (or frame member 23) via bolting, riveting, welding or other conventional methods. It will be appreciated, however, that a wide variety of structure may be used in place of or in addition to the frame 834 to facilitate attachment of the arms 830a, 830b to the vehicle, or to different vehicle makes and models.

As with the embodiments discussed above, the retractable vehicle step 820 shown in FIGS. 20-21 defines a set of first through fourth axes A-A through D-D corresponding to the previously-discussed sets of axes. For the sake of clarity, the distances between the various axes A-A through D-D are not marked on FIGS. 20-21; however, the following discussion of the geometry of the layout of the axes applies with equal force to the embodiment of FIGS. 20-21, as it did with regard to the embodiments discussed above. With reference to FIG. 20, the first axis A-A is spaced from the third axis C-C by a first distance and the second axis B-B is spaced from the fourth axis D-D by a second distance. In one embodiment, the first and second distances are unequal; in another embodiment the first distance is greater than the second distance.

The first axis A-A is spaced from the second axis B-B by a third distance and the third axis C-C is spaced from the fourth axis D-D by a fourth distance. In one embodiment, the third and fourth distances are unequal; in another embodiment the third distance is greater than the second distance. In one embodiment, a line connecting the first axis A-A and the third axis C-C is non-parallel to a line connecting the second axis B-B and the fourth axis D-D when the retractable vehicle step 820 is in the retracted and/or deployed position. In one embodiment, the line connecting the first axis A-A and the third axis C-C is angularly displaced from vertical by a smaller angle than is the line connecting the second axis B-B and the fourth axis D-D, when the retractable vehicle step 820 is in the deployed position.

The arms 830a, 830b to facilitate an extremely wide range of motion of the arms and step member while permitting the arm(s) to be made relatively thick and strong. With a greater range of motion thus imparted to the arms 830a, 830b and step member 822, the member 822 can extend farther from the vehicle when deployed and retract further into the vehicle for improved concealment.

In the depicted embodiment, the arms 830a, 830b are bent to such a degree that, when the step member 822 is in the retracted position A, a line connecting the first and third axes A-A, C-C will intersect a portion of the rear arm 830b near the second axis B-B, and/or a line connecting the second and fourth axes B-B, D-D will intersect a portion of the front arm 830a near the third axis C-C. As a result, one or both of the third and fourth axes C-C, D-D is situated above the first axis A-A when the step member 822 is in the retracted position A.

The retractable step 820 shown in FIGS. 20-21 thus has a wide range of motion, such that the entirety of the stepping deck 824 is located outboard of the first axis A-A when the step member is in the deployed position B and at least a portion of the stepping deck 824 is located inboard of the second axis B-B when the step member is in the retracted position A.

In one embodiment, the rear arm 830b forms a stop surface 833 near the third axis C-C. The stop surface 833 is configured so that, when the step member 822 is in the deployed position B, the stop surface 833 is the forward-most portion of the rear arm 830b. Thus, the stop surface 833 contacts the rear surface of the front arm 830a, preventing the arm(s) from rotating past the deployed position A. As detailed above, once in the deployed position A, a load placed on the stepping deck 824 (or even the weight of the retractable step alone) will increase the force pressing the stop surface 833 against the front arm 830a. The retractable step thus remains firmly "locked" in the deployed position under the applied load, and no torque reaction is transmitted to any drive system connected to the arms 830a, 830b.

In the illustrated embodiment, the stop surface 833 has a flattened configuration which contacts a similarly flat portion of the rear surface of the front arm 830a, when the step member 822 is in the deployed position B. In other embodiments, a rounded shape or any other suitable shape may be employed.

The stop surface 833, as well as the stop 52/152 and deployment stop 231b, may be considered a "static stop member." As used herein, the term "static stop member" refers to any member which prevents movement of the retractable vehicle step beyond the deployed position B, by coming into contact with a moving portion (such as one of the arms) of the retractable vehicle step and is either (i) fixed and substantially immobile with respect to the vehicle (e.g., the stop 52/152) or (ii) fixed to or integrally formed with one of the arms or the step member (e.g., the deployment stop 231b, intermediate portion 545/645 or stop surface 833). As discussed in detail above, when a static stop member is used with various configurations of the retractable vehicle step, the step can be maintained in the deployed position B simply by the weight of the retractable step itself (and any load placed on the stepping deck) without need for complex, unreliable lockouts, toggles, spring-loaded catches, etc., and without transmitting a torque reaction to any drive system connected to the arm(s) of the retractable step. In other words, the static stop member, arms and step member are sufficient to maintain the stepping deck in the deployed position upon movement of the retractable step thereto.

In this sense, where contact between two arms of the retractable step prevents movement of the step beyond the deployed position, either or both of the contacting portions may be considered a static stop member. It is contemplated that any of the static stop members disclosed herein may be employed with any of the embodiments of the retractable step disclosed herein.

FIGS. 22-26 depict another embodiment of the retractable vehicle step 920, which may be similar to the embodiments discussed above except as disclosed below. The retractable step 920 comprises a stepping member 922 that includes a stepping deck 924 bolted or otherwise rigidly connected to a support bracket 926. Front and rear support arms 930a, 930b are rotatably connected to the support bracket 926 via pins 932a, 932b. A rigid frame 934, which may be configured as necessary for connection to the vertical underbody portion 16, provides a secure mounting for the support arms 930a, 930b which are rotatably mounted to the frame 934 via pins 936a, 936b. The stepping deck 924 defines a generally flat upper stepping surface 924c.

The frame 934 may be fixed to the vertical underbody portion 16 via bolting, riveting, welding or other conventional methods. It will be appreciated, however, that while the frame 934 is preferred, a wide variety of structure may be used in place of or in addition to the frame 934 to facilitate attachment of the arms 930a, 930b to the vehicle, or to different vehicle makes and models.

Figure 22:
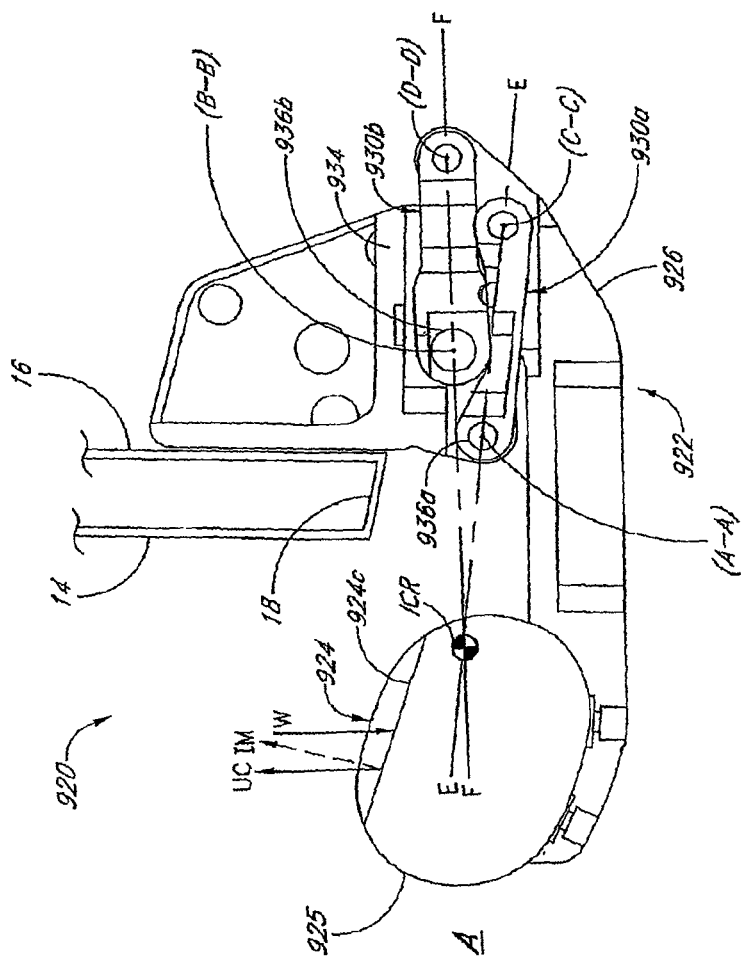
FIG. 22 is a side sectional view of a further embodiment of a retractable vehicle step, in the retracted position.
Figure 23:
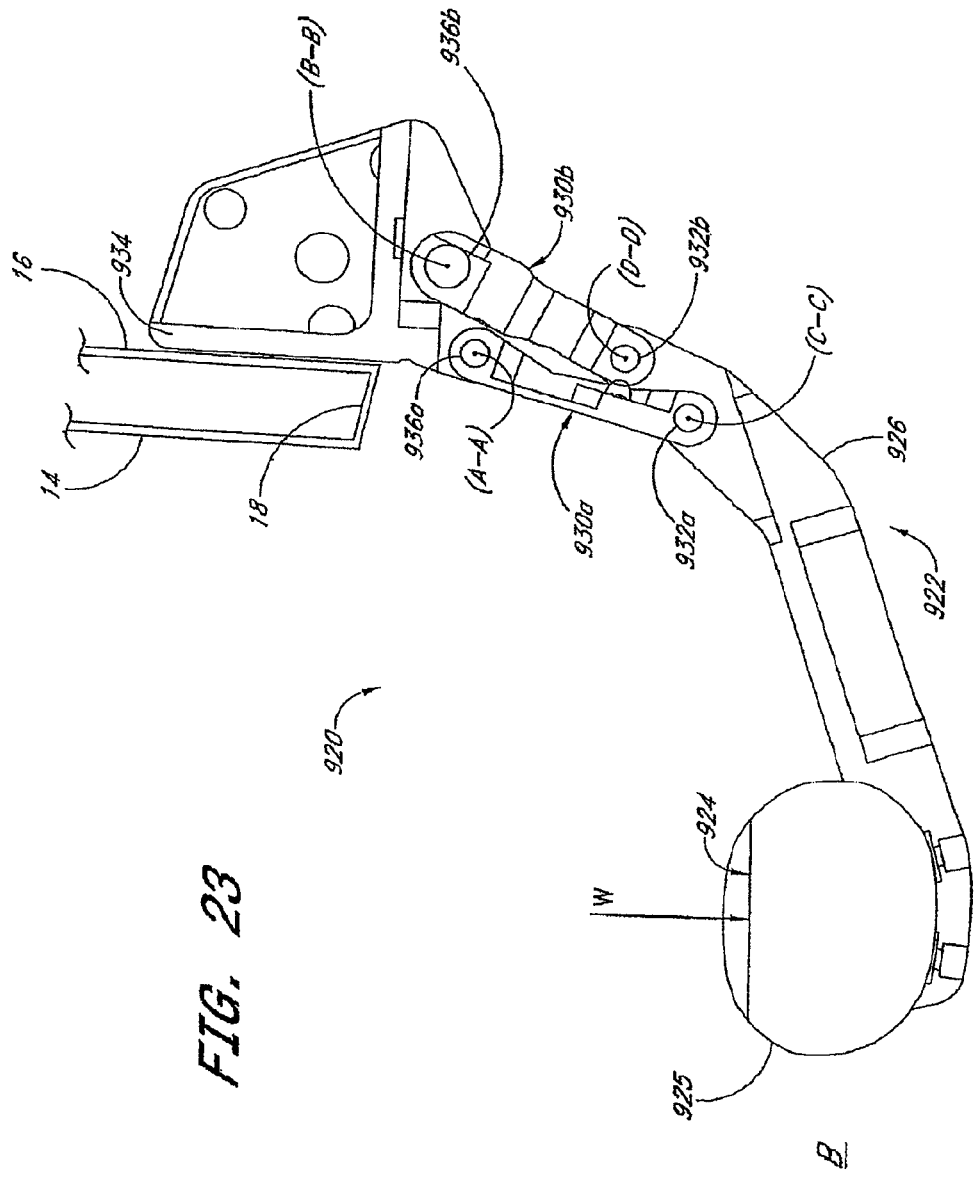
FIG. 23 is a side sectional view of the embodiment of FIG. 22, in the deployed position.
Figure 24:
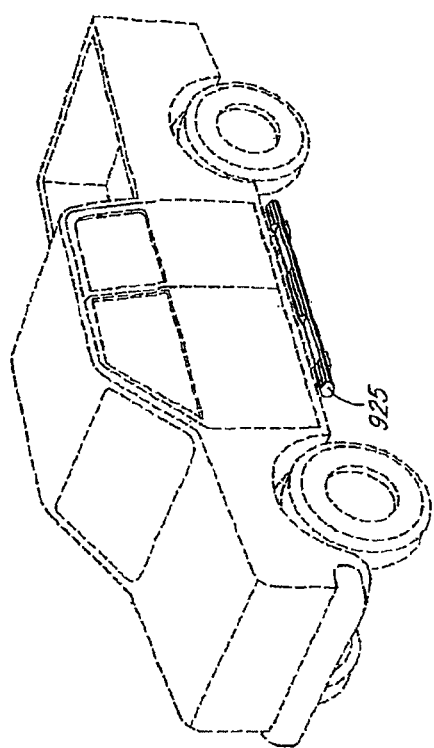
FIG. 24 is a perspective view of the retractable step of FIG. 22, when in use on a vehicle and in the retracted position.

As with the embodiments discussed above, the retractable vehicle step 920 shown in FIG. 22 defines a set of first through fourth axes A-A through D-D corresponding to the previously-discussed sets of axes. For the sake of clarity, the distances between the various axes A-A through D-D are not marked on FIGS. 20-21; however, the following discussion of the geometry of the layout of the axes applies with equal force to the embodiment of FIG. 22, as it did with regard to the embodiments discussed above. With reference to FIG. 22, the first axis A-A is spaced from the third axis C-C by a first distance and the second axis B-B is spaced from the fourth axis D-D by a second distance. In one embodiment, the first and second distances are unequal; in another embodiment the first distance is greater than the second distance.

The first axis A-A is spaced from the second axis B-B by a third distance and the third axis C-C is spaced from the fourth axis D-D by a fourth distance. In one embodiment, the third and fourth distances are unequal; in another embodiment the third distance is greater than the second distance. In one embodiment, a first line E-E connecting the first axis A-A and the third axis C-C is non-parallel to a second line F-F connecting the second axis B-B and the fourth axis D-D when the retractable vehicle step 920 is in the retracted and/or deployed position. In one embodiment, the first line E-E connecting the first axis A-A and the third axis C-C is angularly displaced from vertical by a smaller angle than is the second line F-F connecting the second axis B-B and the fourth axis D-D, when the retractable vehicle step 920 is in the deployed position.

The first line E-E intersects the second line F-F at an instantaneous center of rotation ICR of the step member 922. The ICR marks the instantaneous position of the pivot axis about which the step member 922 would rotate if the arms 930a, 930b were to rotate from their present positions about the first and second axes A-A, B-B.

The retractable step 920 shown in FIG. 22 is configured to maintain the retracted position A, even upon placement of a heavy load on the stepping deck 924, without need for a separate locking system or input from a drive mechanism or motor. In other words, the retractable step 920 is "self-energizing" when in the retracted position A. When the step member 922 is in the retracted position A, the arms 930a, 930b are configured so that the instantaneous center of rotation ICR is located at, or inboard of, the upper stepping surface 924c of the stepping deck 924. (This is illustrated as zones 960, 962, 964, 966, 968 in FIG. 22A.) This in turn dictates that when the step member 922 moves toward the deployed position, the initial motion from the retracted position A of at least a portion of the upper surface 924c of the stepping deck 924 is upward (or has an upward component), after which the step member 922 and upper stepping surface 924c travel generally downward (or downward and outboard) to the deployed position B. When the step member 922 is in the retracted position, placement of a load on the upper stepping surface 924c thus urges the step member toward the retracted position, but further movement in that direction is prevented by the contact between the arms 930a, 930b. Consequently, the step member 922 can support heavy loads placed on the upper stepping surface 924c when in the retracted position, without need for a separate locking system, etc.

More generally, the retractable step 920 is self-energizing in the retracted position A, when the arms 930a, 930b are arranged so that the instantaneous center of rotation ICR is located (along an inboard-outboard axis) at, or anywhere inboard of, a load W applied to the step member 922. (The load W is depicted herein as a point load; it should be understood that references herein to the location of a load on the step member 922 mean the point-load representation of any distributed load (such as part of a user's weight transmitted through a foot placed on the upper stepping surface 924c) that is applied to the step member.) It has been found that while arranging the retracted positions of the arms 930a, 930b to place the instantaneous center of rotation ICR as far inboard as possible maximizes the self-energizing properties of the retractable step, locating the instantaneous center of rotation ICR too far inboard decreases the range of motion of the retractable step by requiring a sub-optimal arrangement of the arms 930a, 930b when retracted. Consequently, in one embodiment, the arms 930a, 930b are arranged to locate the instantaneous center of rotation ICR at, or slightly inboard of, the inboard quarter, half or two-thirds of the upper stepping surface 924c of the stepping deck 924 (zone 959, 960, or the sum of zones 960 and 962 in FIG. 22A). In another embodiment, the instantaneous center of rotation ICR is located at, or slightly inboard of, the entire extent of the upper stepping surface 924c of the stepping deck 924 (the sum of zones 960, 962 and 964 in FIG. 22A).

In still other embodiments, when the retractable step 920 is in the retracted position the instantaneous center of rotation ICR is located further inboard, i.e. in zone 966 extending outboard from the first axis A-A to a location somewhat inboard of the upper stepping surface 924c, or in zone 968, which is anywhere inboard of the first axis A-A. However, with the center ICR located in either of these zones the range of motion of the retractable step may be diminished as discussed above. In yet another embodiment, the center ICR may be located in zone 970, between the outboard edge of the step member 922/stepping deck 924 and the outboard edge of the upper stepping surface 924c. However, with the center ICR located in zone 970, the step may be self-energizing only if the load W is applied near the extreme outboard edge of the step member 922.

In following good engineering practice, it may be desirable to arrange the retracted positions of the arms 930a, 930b to place the instantaneous center of rotation ICR at or inboard of a step region which is defined as the entire portion of the step member 922 upon which a user is likely to step. In one embodiment, the step region may comprise the entire stepping deck 924 plus that portion of the support bracket 926 which is adjacent to the inboard edge of the stepping deck 924. This step region would encompass the sum of zones 960, 962, 964 and 970 depicted in FIG. 22A. In one embodiment, the step region may comprise the entire upper stepping surface 924c plus that portion of the support bracket 926 which is adjacent to the inboard edge of the stepping deck 924. This step region would encompass the sum of zones 960, 962 and 964 depicted in FIG. 22A. In another embodiment, the step region may comprise the entire stepping deck 924 plus substantially all of that portion of the support bracket 926 which protrudes from the vehicle. This step region would encompass the sum of zones 960, 962, 964, 966 and 970 depicted in FIG. 22A. Finally, whether the stepping deck is formed as part of a rail 925 (see further discussion below), or as a "plain" flat member like those disclosed above, the step region may comprise anywhere that a user is likely to set foot upon the step member 922.

In light of the above-described properties of the retractable step 920, the step region/stepping deck follows a unique deployment path when moving from the retracted position A to the deployed position B. The deployment path is characterized by an initial upward component UC (see FIG. 22) which may be only a component of an overall initial motion IM. After first moving (from the retracted position A) in the direction of the initial upward component UC or initial motion IM, the step region/stepping deck moves generally downward and outboard to the deployed position B.

Figure 25:
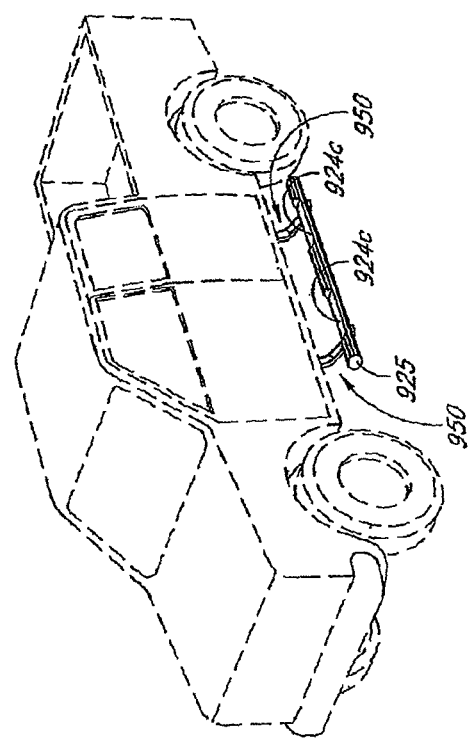
FIG. 25 is a perspective view of the retractable step of FIG. 22, when in use on a vehicle and in the deployed position.

Because the retractable step 920 possesses self-energizing properties when in the retracted position, the step 920 is suitable for providing running board when retracted, and a convenient step when deployed. To this end, the upper stepping surface 924c may be formed as part of a rail 925 which serves as a running board when retracted (see FIG. 24), having a retracted position relatively close to, and just outboard of, the vehicle doors. When deployed, the rail 925 is rotated downward somewhat, so that the upper stepping surface 924c takes on a substantially horizontal orientation (see FIGS. 23, 25). Advantageously, the generally tubular form of the rail 925 may prevail at the front and rear ends thereof, to provide an "off-road" look when the rail 925 is retracted and serving as a running board. Again, the upper stepping surface 924c is formed in the rail 925, and reaches a convenient horizontal position when the rail is extended to serve as a step. As seen in FIG. 25, the rail 925 may be made wide enough to serve as a running board or step for persons desiring to enter either of two adjacent doors of the vehicle; in this case the upper stepping surface 924c may be formed as two separate flattened portions of the rail 925. In other embodiments a "plain" flat deck, board or other member may be used in place of the rail 925.

However, regardless of the precise structure employed, the rail, board, etc. may be mounted on two or more retraction assemblies 950 which provide retraction and deployment therefor. Each of the retraction assemblies 950 may comprise structure which generally similar to any of the embodiments disclosed herein for the retractable vehicle step; however, the embodiment shown in FIGS. 24 and 25 utilizes the mechanism disclosed above in connection with FIGS. 22-23. One or both of the assemblies 950 may include a motor for moving the step between the retracted position (FIG. 24) and the deployed position (FIG. 25).

Figure 26:
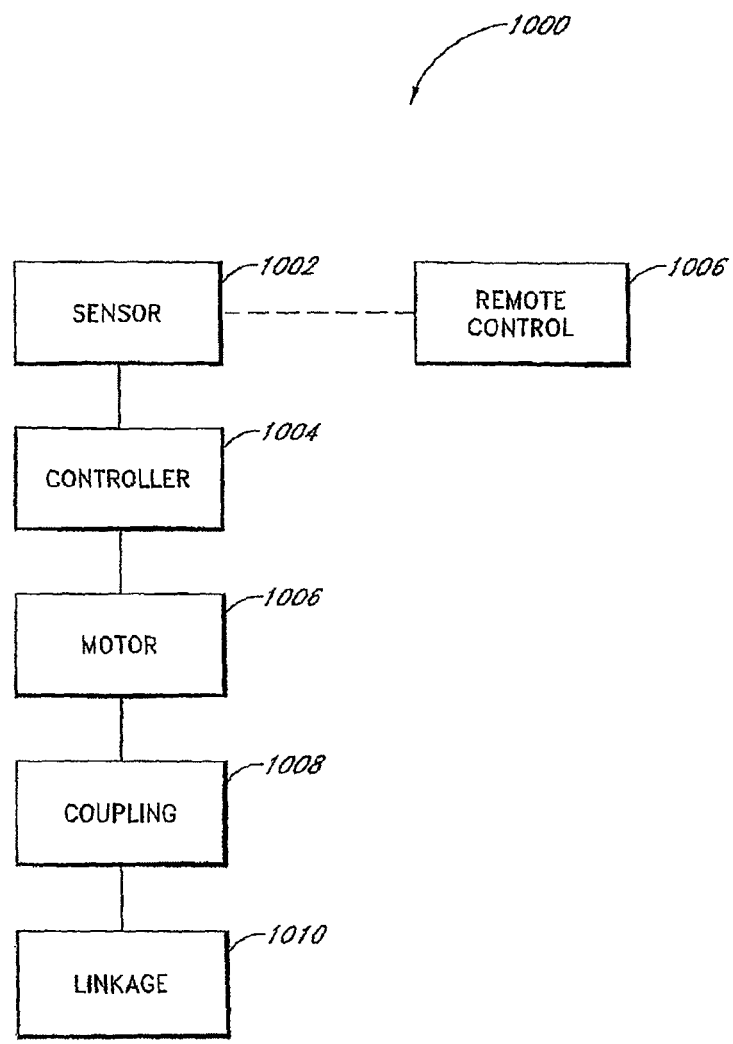
FIG. 26 is a schematic depiction of a retractable step system suitable for implementing various embodiments of the retractable step.

FIG. 26 is a schematic depiction of an overall retractable step system 1000 according to which any of the embodiments disclosed herein may be implemented. Control inputs are received by a sensor system 1002 and sent to an electronic controller 1004 for processing. The control inputs, such as commands to extend, retract or stop the retractable step, may be generated by a remote control 1006, and/or a vehicle ignition switch, switches in the vehicle doors or door handles, an anti-pinch/anti-strike system, limit switches at the extremes of the range of motion of the retractable step, a timer, etc. The controller 1004 processes the control inputs and passes an appropriate power signal to a motor 1006, which turns in the appropriate direction for extension or retraction of the retractable step. The motor 1006, acting through a coupling 1008 (which may comprise a torque limiter and/or appropriate gear system as discussed above), causes the linkage 1010 (e.g. the arms and step member) to move toward the extended or retracted position as needed.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A retractable vehicle step assist assembly configured for use with a vehicle having an underside, said retractable vehicle step assist assembly comprising:
    a first support linkage connectable with respect to the underside of the vehicle so as to be pivotable about a first axis oriented generally parallel to the ground;
    a first drive linkage connectable with respect to the underside of the vehicle so as to be pivotable about a second axis oriented generally parallel to the ground;
    a second support linkage;
    a step member having an upper stepping surface, said first support linkage and said first drive linkage connected to said step member so that said first support linkage and said first drive linkage are pivotable with respect to said step member about a third axis and a fourth axis, respectively;
    said first support linkage and said first drive linkage allowing said step member to move between a retracted position and a deployed position along a first rotational plane generally perpendicular to said first axis; and
    a drive assembly coupled to said first drive linkage and comprising a motor having a longitudinal length greater than a transverse length, said longitudinal length defining a longitudinal axis, said longitudinal axis being generally parallel to said first rotational plane, wherein
    as said drive assembly rotates said first drive linkage to move said step member between said retracted position and said deployed position, said first support linkage moves along a second rotational plane and said first drive linkage moves along a third rotational plane, said first, second, and third rotational planes being generally parallel and second rotational plane being offset from said third rotational plane;
    wherein said second support linkage is configured to move along said second rotational plane.

2. The step assist assembly of claim 1, wherein said first drive linkage is a unitary rigid arm.

3. The step assist assembly of claim 1, wherein first said support linkage is a unitary rigid arm.

4. The step assist assembly of claim 1, wherein said second support linkage moves along said third rotational plane.

5. The step assist assembly of claim 1, wherein said first drive linkage is connected to said step member by a support bracket extending upward and rearward from an upper surface of said step member.

6. The step assist assembly of claim 1, further comprising a system to stop motion of said step member when an obstruction is encountered within the range of motion of said step member or one of said moving linkages.

7. The step assist assembly of claim 1, further comprising an electrical connection configured to link said drive assembly and an electrical system of the vehicle such that said step member is configured to move to said extended position upon opening a door of said vehicle.

8. The step assist assembly of claim 1, further configured to isolate said drive assembly from back-loading when a load is placed on said step member in the extended position.

9. The step assist assembly of claim 1, wherein said second support linkage is connectable with respect to the underside of the vehicle so as to be pivotable about said first axis oriented generally parallel to the ground.

10. The step assist assembly of claim 1, wherein said second support linkage is connected to said step member so that said second support linkage is pivotable with respect to said step member about said third axis and a fourth axis, respectively.

11. The step assist assembly of claim 10, wherein said first and second support linkages connect to said step member on a rear half of said step member.

12. The step assist assembly of claim 1, wherein second said support linkage is a unitary rigid arm.

13. The step assist assembly of claim 1, wherein said motor interacts with said first drive linkage through a gear assembly.

14. The step assist assembly of claim 1, further comprising a stop attached to said underside of said vehicle, wherein in said deployed position at least one of said support linkages contacts said stop.

15. The step assist assembly of claim 14, wherein when a downward force is deployed on said step member, said force is at least partially transferred to said stop through at least one of said support linkages.

16. The step assist assembly of claim 1, wherein when in said deployed position, said first and second support linkages are loaded in tension.

17. The step assist assembly of claim 1, wherein there is no back-loading of the motor.

18. The step assist assembly of claim 1, wherein a clutch is not used.

19. The step assist assembly of claim 1, further comprising a cover mounted on said underside of said vehicle, said step member configured to be stored in said dust cover when in the retracted position.

* * * * *

UNITED STATES PATENT AND TRADEMARK OFFICE
CERTIFICATE OF CORRECTION

PATENT NO. : 8,844,957 B2
APPLICATION NO. : 13/853904
DATED : September 30, 2014
INVENTOR(S) : Horst Leitner et al.

It is certified that error appears in the above-identified patent and that said Letters Patent is hereby corrected as shown below:

In the Specification

In column 6 at line 10, Change "to yet be" to --yet to be--.

In the Claims

In column 34 at line 42, In Claim 3, change "first said" to --said first--.

In column 35 at lines 7-8, In Claim 12, change "second said" to --said second--.

Signed and Sealed this
Twenty-first Day of April, 2015

Michelle K. Lee
*Director of the United States Patent and Trademark Office*